US012646866B2

(12) United States Patent
Scanzillo et al.

(10) Patent No.: US 12,646,866 B2
(45) Date of Patent: Jun. 2, 2026

(54) ELECTRICAL WIRING DEVICES WITH SCREWLESS WIRE TERMINALS

(71) Applicant: Hubbell Incorporated, Shelton, CT (US)

(72) Inventors: Thomas L. Scanzillo, Monroe, CT (US); Denny Lo, Bethlehem, CT (US); Edward Bazayev, Kew Gardens, NY (US)

(73) Assignee: Hubbell Incorporated, Shelton, CT (US)

( * ) Notice: Subject to any disclaimer, the term of this patent is extended or adjusted under 35 U.S.C. 154(b) by 386 days.

(21) Appl. No.: 18/122,608

(22) Filed: Mar. 16, 2023

(65) Prior Publication Data

US 2023/0299508 A1 Sep. 21, 2023

Related U.S. Application Data

(60) Provisional application No. 63/320,603, filed on Mar. 16, 2022.

(51) Int. Cl.
*H01R 4/48* (2006.01)

(52) U.S. Cl.
CPC .................................... *H01R 4/48* (2013.01)

(58) Field of Classification Search
CPC ...... H01R 4/48; H01R 9/2491; H01R 4/4842; H01R 4/483; H01R 4/4816
USPC .......................................................... 439/816
See application file for complete search history.

(56) References Cited

U.S. PATENT DOCUMENTS

| | | | |
|---|---|---|---|
| 1,994,880 | A | 3/1935 | Wallbillich |
| 2,015,858 | A | 10/1935 | Leviton |
| 2,082,994 | A | 6/1937 | Wallbillich |
| 2,163,722 | A | 6/1939 | Wallbillich |
| 2,175,098 | A | 10/1939 | Wertzheiser |
| 2,201,743 | A | 5/1940 | Peterson |
| 2,201,751 | A | 5/1940 | Wertzheiser |
| 2,238,386 | A | 4/1941 | Frank |

(Continued)

FOREIGN PATENT DOCUMENTS

| | | |
|---|---|---|
| CA | 981354 | 1/1976 |
| CA | 1202095 | 3/1986 |

(Continued)

OTHER PUBLICATIONS

Wago Cage Clamp Tech Brochure Sep. 2010 (22 pages).

(Continued)

*Primary Examiner* — Tulsidas C Patel
*Assistant Examiner* — Jeffrey Mountain
(74) *Attorney, Agent, or Firm* — Wissing Miller LLP

(57) ABSTRACT

Electrical wiring devices that incorporate screwless wire terminal connections are described. The electrical wiring devices include for example, single and duplex blade-type electrical receptacles, blade-type locking electrical receptacles, single or multi-pole electrical switches, combination switches and blade-type receptacles, blade-type plugs for electrical cords, blade-type connectors for electrical cords, male and female inlet connectors and pin-in-sleeve connectors. The electrical wiring devices include a plurality of contact assemblies having a horizontally moving or rotating activating member that permits wires to be inserted into or removed from the contact assemblies.

42 Claims, 19 Drawing Sheets

(56) References Cited

U.S. PATENT DOCUMENTS

| | | | |
|---|---|---|---|
| 2,463,033 | A | 3/1949 | Harnett |
| 2,466,930 | A | 4/1949 | Cook |
| 2,506,212 | A | 5/1950 | Cook |
| 2,556,491 | A | 6/1951 | DeLorenzo |
| 2,763,847 | A | 9/1956 | Hubbell |
| 2,952,831 | A | 9/1960 | Ehrlich |
| 3,431,546 | A | 3/1969 | Averill |
| 3,439,315 | A | 4/1969 | Hamel et al. |
| 3,660,728 | A | 5/1972 | Carter |
| 3,713,071 | A | 1/1973 | Poliak et al. |
| 3,740,613 | A | 6/1973 | Strachan |
| 3,793,607 | A | 2/1974 | Smith et al. |
| 3,891,293 | A | 6/1975 | Jones |
| 3,904,266 | A | 9/1975 | Fitzpatrick |
| 3,944,314 | A | 3/1976 | Weitzman |
| 3,945,711 | A | 3/1976 | Hohorst et al. |
| 3,999,829 | A | 12/1976 | Glaesel |
| 4,060,305 | A | 11/1977 | Poliak et al. |
| 4,099,826 | A | 7/1978 | Mazzeo et al. |
| 4,172,628 | A | 10/1979 | Lingaraju |
| 4,241,498 | A | 12/1980 | Brandeau |
| 4,255,655 | A | 3/1981 | Kikuchi |
| 4,286,836 | A | 9/1981 | Rumps |
| 4,296,987 | A | 10/1981 | Lingaraju |
| 4,372,693 | A | 2/1983 | Lutz |
| 4,537,560 | A | 8/1985 | Emeterio et al. |
| 4,748,431 | A | 5/1988 | Saunders et al. |
| 4,749,368 | A | 6/1988 | Mouissie |
| 4,759,726 | A | 7/1988 | Naylor et al. |
| 4,767,340 | A | 8/1988 | Hohorst |
| 4,768,981 | A | 9/1988 | Hohorst |
| 4,793,823 | A | 12/1988 | Cozzens et al. |
| 4,886,472 | A | 12/1989 | Tsai |
| 4,995,829 | A | 2/1991 | Geib et al. |
| 5,015,201 | A | 5/1991 | Brezee et al. |
| 5,057,649 | A | 10/1991 | Ring |
| 5,138,296 | A | 8/1992 | Borchardt et al. |
| 5,151,642 | A | 9/1992 | Lombardi |
| 5,181,310 | A | 1/1993 | Josephson |
| 5,262,749 | A | 11/1993 | Kopelman |
| 5,494,456 | A | 2/1996 | Kozel et al. |
| 5,637,011 | A | 6/1997 | Meyerhoefer et al. |
| 5,685,735 | A | 11/1997 | Hohorst |
| 5,810,625 | A | 9/1998 | Klein |
| 5,825,602 | A | 10/1998 | Tosaka et al. |
| 5,866,844 | A | 2/1999 | Osterbrock et al. |
| 5,975,938 | A | 11/1999 | Libby |
| 5,975,940 | A | 11/1999 | Hartmann et al. |
| 5,995,350 | A | 11/1999 | Kopelman |
| 6,049,143 | A | 4/2000 | Simpson et al. |
| 6,146,217 | A | 11/2000 | Osada |
| 6,172,586 | B1 | 1/2001 | Ferree et al. |
| 6,315,597 | B1 | 11/2001 | Coyne et al. |
| 6,336,824 | B1 | 1/2002 | Sorig |
| 6,368,149 | B1 | 4/2002 | Schmidt et al. |
| 6,388,216 | B1 | 5/2002 | Puhalla et al. |
| 6,406,323 | B2 | 6/2002 | Chung Long Shan |
| 6,474,678 | B1 | 11/2002 | Ryan |
| 6,477,021 | B1 | 11/2002 | Haun et al. |
| 6,689,955 | B2 | 2/2004 | Doutaz |
| 6,707,652 | B2 | 3/2004 | Engel |
| 6,712,641 | B2 | 3/2004 | Beege et al. |
| 6,743,029 | B1 | 6/2004 | Greene et al. |
| 6,750,402 | B2 | 6/2004 | Geske |
| 6,786,779 | B2 | 9/2004 | Feldmeier et al. |
| 6,802,747 | B1 | 10/2004 | Orange |
| 6,814,608 | B2 | 11/2004 | Kollmann |
| 6,827,602 | B2 | 12/2004 | Greene et al. |
| 6,861,189 | B1 | 3/2005 | Greene et al. |
| 6,893,286 | B2 | 5/2005 | Drewes et al. |
| 6,926,543 | B2 | 8/2005 | Poh et al. |
| 6,943,310 | B2 | 9/2005 | Eisenhower |
| 6,948,846 | B2 | 9/2005 | Engel |
| 7,052,335 | B2 | 5/2006 | Matsuura et al. |
| 7,097,518 | B2 | 8/2006 | Kraemer et al. |
| 7,103,968 | B2 | 9/2006 | Karrasch |
| 7,114,986 | B1 | 10/2006 | Toly |
| 7,115,001 | B1 | 10/2006 | Brockman et al. |
| 7,118,404 | B2 | 10/2006 | Ploesser |
| 7,140,887 | B2 | 11/2006 | Poh et al. |
| 7,150,646 | B2 | 12/2006 | Trumper |
| 7,164,082 | B2 | 1/2007 | Kurek |
| 7,175,485 | B1 | 2/2007 | Alderson et al. |
| 7,238,043 | B2 | 7/2007 | Reibke et al. |
| 7,241,188 | B2 | 7/2007 | Lin et al. |
| 7,249,963 | B2 | 7/2007 | Ramm |
| 7,270,581 | B2 | 9/2007 | Tiberio |
| 7,507,106 | B2 | 3/2009 | Keswani et al. |
| 7,544,103 | B2 | 6/2009 | Walter et al. |
| 7,547,226 | B2 | 6/2009 | Koessler |
| 7,651,363 | B2 | 1/2010 | Koellmann |
| 7,704,095 | B2 | 4/2010 | Stromiedel |
| 7,704,106 | B2 | 4/2010 | Koellmann |
| 7,815,463 | B2 | 10/2010 | Gerberding |
| 7,845,970 | B2 | 12/2010 | Stromiedel |
| 7,909,664 | B2 | 3/2011 | Ilkhanov |
| 7,963,812 | B2 | 6/2011 | Ilkhanov |
| 8,047,883 | B2 | 11/2011 | Montalbano et al. |
| 8,137,145 | B2 | 3/2012 | Joy |
| 8,251,738 | B2 | 8/2012 | Heckert et al. |
| 8,292,677 | B2 | 10/2012 | Gassauer |
| 8,328,588 | B2 | 12/2012 | Ramm et al. |
| 8,388,387 | B2 | 3/2013 | Koellmann |
| 8,408,952 | B2 | 4/2013 | Wu |
| 8,480,424 | B2 | 7/2013 | Koellmann et al. |
| 8,535,084 | B2 | 9/2013 | Koellmann |
| 8,632,355 | B2 | 1/2014 | Hartmann |
| 8,794,994 | B2 | 8/2014 | Koellmann et al. |
| 8,998,634 | B2 | 4/2015 | Koellmann |
| 9,124,034 | B2 | 9/2015 | Koellmann et al. |
| 9,130,285 | B2 | 9/2015 | Scanzillo et al. |
| 9,209,530 | B2 | 12/2015 | Gassauer et al. |
| 9,246,242 | B2 | 1/2016 | Scanzillo et al. |
| 9,287,638 | B2 | 3/2016 | Germani |
| 9,331,427 | B2 | 5/2016 | Tedeschi |
| 9,413,082 | B2 | 8/2016 | Gassauer |
| 9,466,895 | B2 | 10/2016 | Kollmann et al. |
| 9,466,911 | B1 | 10/2016 | Wu |
| 9,478,874 | B2 | 10/2016 | Stolze |
| 9,502,790 | B2 | 11/2016 | Kollmann et al. |
| 9,525,219 | B2 | 12/2016 | Kollmann et al. |
| 9,543,700 | B2 | 1/2017 | Kollmann et al. |
| 9,601,844 | B2 | 3/2017 | Gassauer et al. |
| 9,614,301 | B2 | 4/2017 | Ludewig et al. |
| 9,614,302 | B2 | 4/2017 | Harwath et al. |
| 9,761,964 | B2 | 9/2017 | Meyer |
| 9,799,997 | B2 | 10/2017 | Scanzillo et al. |
| 9,812,822 | B2 | 11/2017 | Scanzillo et al. |
| 9,842,408 | B2 | 12/2017 | Milne et al. |
| 10,131,061 | B2 | 11/2018 | Krans et al. |
| 10,141,674 | B2 | 11/2018 | Scanzillo et al. |
| 10,427,201 | B2 | 10/2019 | Bungter et al. |
| 10,431,950 | B2 | 10/2019 | Rzasa et al. |
| 10,461,444 | B2 | 10/2019 | Scanzillo et al. |
| 10,630,036 | B2 | 4/2020 | Rzasa et al. |
| 10,637,165 | B2 | 4/2020 | Scanzillo et al. |
| 10,965,042 | B2 | 3/2021 | Scanzillo et al. |
| 10,992,067 | B2 | 4/2021 | Geske et al. |
| 11,063,396 | B2 | 7/2021 | Iaconis et al. |
| 11,495,895 | B2 | 11/2022 | Scanzillo et al. |
| 11,563,281 | B2 | 1/2023 | Scanzillo et al. |
| 12,184,026 | B2 | 12/2024 | Villard et al. |
| 2004/0077210 | A1 | 4/2004 | Kollmann |
| 2004/0248457 | A1 | 12/2004 | Walter |
| 2005/0042912 | A1 | 2/2005 | Drewes et al. |
| 2005/0090159 | A1 | 4/2005 | Luther et al. |
| 2005/0212646 | A1 | 9/2005 | Watchorn et al. |
| 2006/0028316 | A1 | 2/2006 | Fabian et al. |
| 2006/0288140 | A1 | 12/2006 | Lin |
| 2007/0006558 | A1 | 1/2007 | Ramm |
| 2007/0026701 | A1 | 2/2007 | Kurek et al. |
| 2007/0207662 | A1 | 9/2007 | Germani |
| 2007/0238348 | A1 | 10/2007 | Kopelman |
| 2010/0186234 | A1 | 7/2010 | Binder |

(56) References Cited

U.S. PATENT DOCUMENTS

| | | | | |
|---|---|---|---|---|
| 2010/0304596 | A1 | 12/2010 | Ilkhanov | |
| 2010/0304597 | A1 | 12/2010 | Ilkhanov | |
| 2011/0207361 | A1 | 8/2011 | Heckert et al. | |
| 2014/0227914 | A1 | 8/2014 | Tedeschi | |
| 2015/0257636 | A1 | 9/2015 | Kohler | |
| 2015/0314434 | A1 | 11/2015 | Bevins, Jr. | |
| 2017/0256870 | A1* | 9/2017 | Scanzillo | H01R 4/4826 |
| 2019/0160643 | A1 | 5/2019 | Lefavour et al. | |
| 2019/0221951 | A1 | 7/2019 | Lotkemann et al. | |
| 2020/0235541 | A1 | 7/2020 | Rzasa | |
| 2021/0203087 | A1 | 7/2021 | Scanzillo et al. | |

FOREIGN PATENT DOCUMENTS

| | | |
|---|---|---|
| CA | 1203591 | 4/1986 |
| CA | 2939110 | 8/2015 |
| CA | 2996306 | 3/2017 |
| CN | 101051711 A | 10/2007 |
| CN | 201233969 | 5/2009 |
| CN | 101807756 | 8/2010 |
| CN | 202564566 | 11/2012 |
| CN | 103606765 | 2/2014 |
| CN | 103682774 | 3/2014 |
| CN | 103840294 | 6/2014 |
| CN | 205004486 | 1/2016 |
| CN | 205016755 | 2/2016 |
| CN | 113113786 | 7/2021 |
| CN | 113206396 | 8/2021 |
| CN | 120089966 | 6/2025 |
| DE | 3808012 | 4/1993 |
| DE | 19714163 | 8/2000 |
| DE | 102015119247 | 5/2017 |
| DE | 102025108337 | 9/2025 |
| EP | 0131425 | 2/1991 |
| EP | 0955692 | 11/1999 |
| EP | 1553660 | 7/2005 |
| EP | 1490928 | 10/2005 |
| EP | 1608039 | 12/2005 |
| FR | 2312767 | 12/1976 |
| GB | 2272799 | 5/1994 |
| GB | 2292850 | 3/1996 |
| GB | 2393043 | 3/2004 |
| JP | 61014529 | 1/1986 |
| WO | 97003480 | 1/1997 |
| WO | 2017035469 | 3/2017 |
| WO | 2017035518 | 3/2017 |
| WO | 2017125441 | 7/2017 |

OTHER PUBLICATIONS

Marinco Power Products, Straight Blade Clamp-Lock (TM) Devices (15A & 20A), 2016 (3 pages).

Lex_Connector_Power_Conn_Brochure_2019_(12pgs).

International Search Report and Written Opinion dated Jul. 31, 2023 in corresponding PCT/US23/15407 (16 pages).

International Preliminary Report on Patentability in corresponding International Application No. PCT/US2023/015407 mailed Sep. 26, 2024. (9 pages).

* cited by examiner

ELECTRICAL WIRING DEVICES WITH SCREWLESS WIRE TERMINALS

CROSS-REFERENCE TO RELATED APPLICATIONS

The present disclosure is based on and claims benefit from U.S. Provisional Patent Application No. 63/320,603 filed on Mar. 16, 2022 entitled "Electrical Wiring Devices with Screwless Connection Terminals" the contents of which are incorporated herein in their entirety by reference.

BACKGROUND

Field

The present disclosure relates generally to connection terminals for electrical wiring devices and more particularly to screwless wire terminals for use in receptacles, plug assemblies, plug connectors, switches, male inlet connectors, female inlet connectors, pin-in-sleeve connectors, motor control switches and other electrical wiring devices.

Description of the Related Art

Present electrical wire terminations in many electrical wiring devices are either direct pressure type terminations or screw and clamp type terminations. In direct pressure type terminations, a terminal screw is tightened directly against an electrical wire to press the wire against a fixed plate. In screw and clamp type terminations, a wire is inserted between a fixed plate and a movable plate, and a terminal screw is tightened so that the wire is clamped between the plates. With direct pressure type terminations, stranded or solid wires, if incorrectly installed can be cut or nicked. Cut or nicked wires can result in poor electrical connections increasing the resistance in the connections which can cause overheating. In addition, with stranded wires, both direct pressure type terminations and screw and clamp type terminations may be susceptible to strand relaxation. Strand relaxation is a result of copper wire heating and cooling under the stress of the termination, either direct pressure type or screw and clamp type causing the electrical connection between the stranded wire and the termination to loosen increasing the resistance in the connections which can cause overheating. To alleviate strand relaxation concerns, installers typically re-torque terminal screws after some duration of time after original installation increasing costs to consumers.

SUMMARY

The present disclosure provides embodiments of electrical wiring devices that incorporate the wire terminals and activating members according to the present disclosure. The wire terminals and activating members according to the present disclosure are described with the electrical wiring device being a twist lock electrical receptacle. However, the present disclosure contemplates that the wire terminals and activating members may be used with any electrical wiring devices, including other types of receptacles, plug assemblies, plug connectors, single or multi-pole electrical switches, combination switches and receptacles, motor control switches, male inlet connectors, female inlet connectors, pin-in-sleeve connectors, and other electrical wiring devices. Other types of receptacles include, but are not limited to, duplex receptacles, single receptacles, GFCI receptacles and AFCI receptacles. Other types of switches include, but are not limited to, three-way switches and four-way switches. The electrical wiring devices contemplated include, but are not limited to, single phase or single pole electrical wiring devices or multi-phase or multi-pole electrical wiring devices. Non-limiting examples of such devices are provided in commonly owned U.S. Pat. No. 10,461,444 and U.S. Provisional Patent Application No. 63/425,891 the contents of each are incorporated herein in their entirety by reference.

In an exemplary embodiment, a twist lock electrical receptacle is provided that includes a housing and a plurality of contact assemblies, where each contact assembly includes a wire terminal and a corresponding activating member according to the present disclosure. The housing has a main body with a plurality of cavities, a front cover and a rear cover. The front cover is removably secured to a first side of the main body and includes a plurality of blade receiving slots. The rear cover is removably secured to a second side of the main body and includes a plurality of wire receiving apertures and a plurality of plunger openings.

In one exemplary embodiment, one of the plurality of contact assemblies is positioned at least partially within one of the plurality of cavities and is accessible from one of the plurality of wire receiving apertures, from one of the plurality of activating member openings in the rear cover, and is accessible from one of the plurality of blade receiving slots in the front cover. Each of the plurality of the contact assemblies includes a contact member, a wire terminal and an activating member. In an exemplary embodiment, the contact member has a contact body and at least two contact fingers extending from the contact body. The at least two contact fingers are aligned with one of the plurality of blade receiving slots in the front cover. The wire terminal forms an electrically conductive path with the contact member. In one exemplary embodiment, the wire terminal includes a clamp brace and a force applying member secured to the clamp brace. In another exemplary embodiment, the wire terminal includes a clamp brace, force applying member and a contact arm. The contact arm is secured to the contact body and the force applying member is secured to the clamp brace. In both exemplary embodiments, the force applying member may be secured to the clamp brace by, for example, mechanically fitting, e.g., clipping, the force applying member to the clamp brace, or by soldering, brazing or welding the force applying member to the clamp brace. The force applying member is movable relative to the clamp brace between a closed position where a wire can be clamped between the force applying member or mechanical energy device and the clamp brace and an open position where a wire can be inserted through one of the plurality of wire receiving apertures in the rear cover and between the force applying member or mechanical energy device and the clamp brace. In the exemplary embodiments described herein, the force applying member may be a clamping member that clamps a wire to the wire terminal.

The activating member is positioned within one of the plurality of cavities and extends at least partially through one of the plurality of activating member openings in the housing, such as the main body or rear cover. The activating member is interactive with the force applying member such that horizontal or rotational movement of the activating member in a first direction relative to the clamp brace or force applying member causes the activating member to apply a force or mechanical energy, e.g., a mechanical load, to the force applying member to cause the force applying member to move from the closed position to the open position. Horizontal or rotational movement of the activating member in a second direction relative to the clamp brace or force applying member removes the force or mechanical energy from the force applying member so that to the force applying member can move, e.g., automatically move, from the open position to the closed position. In an exemplary embodiment, the activating member is a pushbutton or pivot lever activating member that is configured to selectively interact with the wire terminal to secure, clamp, connect, couple, bind and/or squeeze one or more wires to the wire terminal.

In an exemplary embodiment, an electrical wiring device includes a housing and at least one contact assembly. The housing includes at least one cavity within an interior of the housing, at least one wire receiving opening and at least one activating member opening. The at least one contact assembly is positioned at least partially in the at least one cavity so that the at least one contact assembly is accessible from the at least one wire receiving opening and the at least one activating member opening. The at least one contact assembly includes a wire terminal and an activating member. The wire terminal includes a clamp brace and a force applying member and secured to the clamp brace. The force applying member is movable between a first position where a wire can be secured between the clamp brace and the force applying member, and a second position where a wire can be inserted through the at least one wire receiving opening and between the clamp brace and the force applying member. The activating member has a distal end positioned within the at least one activating member opening and is interactive with the force applying member so that horizontal movement of the activating member in a first direction applies a force or mechanical energy to the force applying member. Applying a force or mechanical energy to the force applying member causes the force applying member to move from the first position to the second position. Releasing a proximal end of the activating member permits the activating member to move in a second direction removing the force or mechanical energy from the force applying member so that to the force applying member moves from the second position to the first position.

In another exemplary embodiment, an electrical wiring device includes a housing and at least one contact assembly. The housing includes a plurality of cavities within an interior of the housing, a plurality of wire receiving openings and a plurality of activating member openings. One of the plurality of contact assemblies is positioned at least partially in one of the plurality of cavities so that the one of the plurality of contact assemblies is accessible from a respective one of the plurality of wire receiving openings, and a respective one of the plurality of activating member openings. Each of the plurality of the contact assemblies includes a wire terminal and an activating member. The wire terminal includes a clamp brace and a force applying member secured to the clamp brace. The force applying member is movable between a first position where a wire can be secured between the clamp brace and the force applying member, and a second position where a wire can be inserted through the one of the plurality of wire receiving openings and between the clamp brace and the force applying member. The activating member has a distal end positioned within the one of the plurality of activating member openings and interactive with the force applying member so that horizontal movement of the activating member in a first direction applies a force or mechanical energy to the force applying member. Applying a force or mechanical energy to the force applying member causes the force applying member to move from the first position to the second position. Releasing a proximal end of the activating member permits the activating member to move in a second direction removing the force or mechanical energy from the force applying member so that to the force applying member moves from the second position to the first position.

In another exemplary embodiment, an electrical wiring device includes a housing and at least one contact assembly. The housing includes at least one cavity within an interior of the housing, at least one wire receiving opening and at least one activating member opening. The at least one contact assembly is positioned at least partially in the at least one cavity so that the at least one contact assembly is accessible from the at least one wire receiving opening and the at least one activating member opening. The at least one contact assembly includes a wire terminal and an activating member. The wire terminal includes a clamp brace and a force applying member secured to the clamp brace. The force applying member is movable between a first position where a wire can be secured between the clamp brace and force applying member, and a second position where a wire can be inserted through the at least one wire receiving opening and between the clamp brace and the force applying member. The activating member has a distal end positioned in the at least one activating member opening and interactive with the force applying member so that rotating the activating member in a first direction causes the distal end of the activating member to apply a force or mechanical energy to the force applying member. Applying a force or mechanical energy to the force applying member causes the force applying member to move from the first position to the second position. Releasing a proximal end of the activating member permits the activating member to move in a second direction removing the force or mechanical energy from the force applying member so that the force applying member moves from the second position to the first position.

In the one or all of the embodiments described herein, the activating member can remain in the first position or the second position until manually moved. In some embodiments, the movement of the activating member in the second direction may be opposite the movement of the activating member in the first direction. In other embodiments, the movement of the activating member in the first direction and the second direction may be parallel to the clamp brace. In other embodiments, the movement of the activating member in the first direction and the second direction is linear. In other embodiments, the movement of the activating member in the first and second directions may be relative to the force applying member or to the clamp brace. In still other embodiments, the movement of the activating member in the first direction may be outward relative to the housing and the movement of the activating member in the second direction may be inward relative to the housing. In still other embodiments, the movement of the activating member in the first direction may be outward relative to a center of the housing and the movement of the activating member in the second direction may be inward relative to the center of the housing. In still other embodiments, the movement of the activating member in the first direction may be inward relative to the housing and the movement of the activating member in the second direction may be outward relative to the housing. In some embodiments, the activating member includes a first face configured to contact at least a portion of the force applying member and a second face having a camming surface configured to contact at least a portion of the one of the plurality of camming members.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

Figure 1:
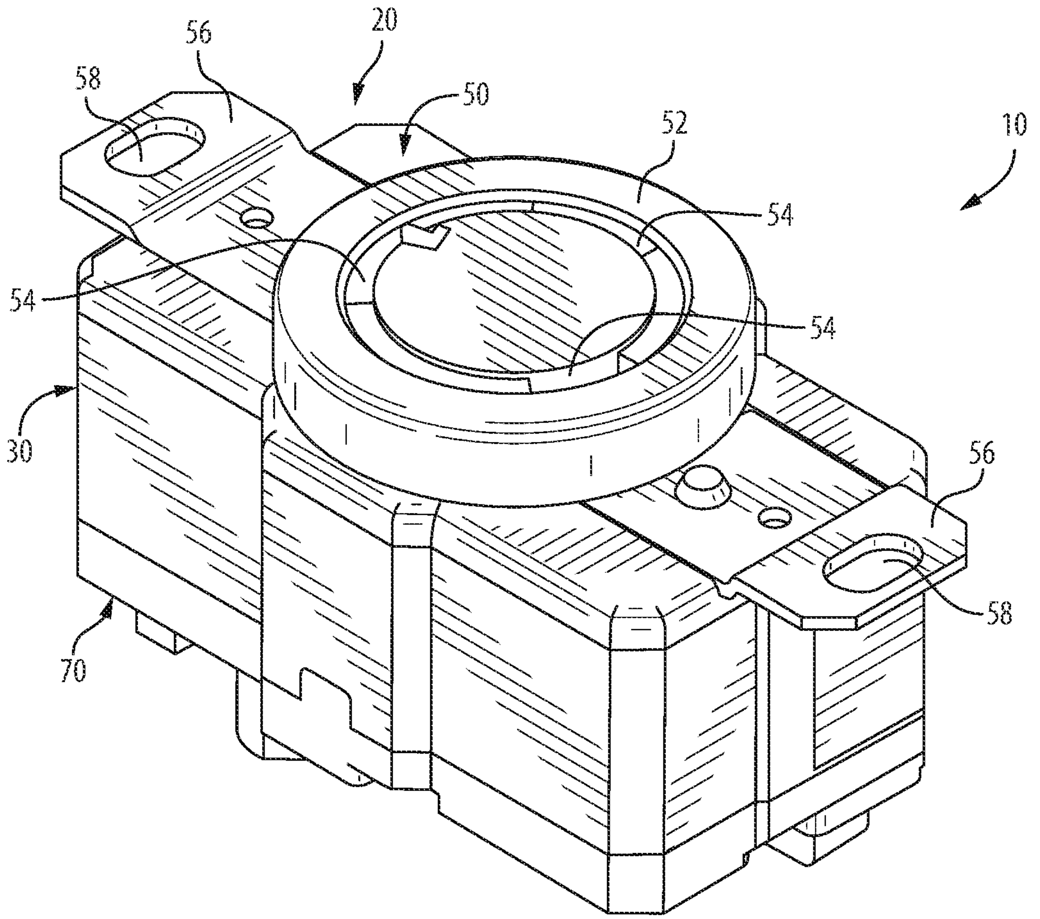
FIG. 1 is a top perspective view of an exemplary embodiment of an electrical wiring device having screwless wire terminals according to the present disclosure.

Exemplary embodiments of electrical wiring devices that incorporate the screwless or clamp wire terminal of the present disclosure are shown and described. Non-limiting examples of the electrical wiring devices contemplated by the present disclosure include, single and duplex blade-type electrical receptacles, blade-type locking electrical receptacles, single or multi-pole electrical switches, combination switches and blade-type receptacles, blade-type plugs for electrical cords, blade-type connectors for electrical cords, male inlet connectors, female inlet connectors, pin-in-sleeve type connectors, motor control switches and other multi-phase or multi-pole electrical wiring devices. Blade-type electrical wiring devices as described herein are; a) male blade-type electrical wiring devices with a plurality of non-circular, e.g., substantially flat or arcuate, power contact blades (hot and/or neutral contact blades) that can mate with corresponding finger contacts within a female blade-type electrical wiring device, or b) female blade-type electrical wiring devices with a plurality of non-circular, e.g., substantially flat or arcuate, power contact blade apertures (hot and/or neutral contact blade apertures) that provide access to contact fingers within the female electrical wiring devices that can mate with corresponding non-circular power contact blades of male blade-type electrical wiring devices. Examples of blade-type electrical wiring devices are described in the National Manufacture Association (NEMA) standard WD6, which is publicly available and incorporated herein in its entirety by reference. In one exemplary embodiment, a blade-type electrical receptacle includes a housing and a plurality of female contact assemblies within the housing that are accessible from an exterior of the housing.

In some embodiments, the housing has a front cover and a main body. In other embodiments, the housing has a front cover, a main body and a rear cover. In each embodiment of an electrical wiring device, each contact assembly has a contact member, a wire terminal and an activating member.

The contact member is used to form a portion of a conductive electrical path. In one embodiment, the wire terminal is used to terminate an electrical conductor inserted into the housing, and the activating member is positioned at least partially in the housing via an opening in the main body of the housing and horizontally moves the wire terminal between open and closed positions. In another embodiment, the wire terminal is used to terminate an electrical conductor inserted into the housing, and the activating member is positioned at least partially in the housing via an opening in the rear cover of the housing and rotationally moves the wire terminal between open and closed positions. The wire terminal includes a clamp brace and a force applying member. A contact arm may be included in the wire terminal to connect the wire terminal to the contact member. The force applying member is used to apply a constant and continuous force or mechanical energy, e.g., a spring force, against an electrical conductor to electrically connect, clamp, secure, couple, bind and/or squeeze the electrical conductor to the clamp brace. A non-limiting example of a force applying member is a clamping member that clamps an electrical conductor against the clamp brace with constant and continuous force or mechanical energy to electrically connect the electrical conductor to the clamp brace. The activating member is used to move the force applying member between the open position permitting an electrical conductor to enter the wire terminal and the closed position connecting, clamping, securing, coupling, binding and/or squeezing the electrical conductor within the wire terminal. The activating member may be a pushbutton or pivotable lever, such as the pushbuttons or pivotable levers described herein, or any other structure that is configured to move the force applying member between the open position permitting one or more electrical wires to enter the wire terminal and the closed position securing, clamping, connecting, coupling, binding and/or squeezing the one or more electrical wires within the wire terminal.

For the purposes of the present disclosure, the electrical conductor may also be referred to as the "wire." Further, the electrical conductor can be any size wire used to conduct electricity, such as 14 AWG wire, 12 AWG wire, 10 AWG wire or 8 AWG wire. Depending upon the number of conductors in a power cord, generally, 14 AWG wires are rated for between 15 and 18 amps, 12 AWG wires are rated for between 20 and 2.5 amps, 10 AWG wires are rated for between 25 and 30 amps, 8 AWG wires are rated for between 35 and 40 amps, and 6 AWG wires are rated for between 45 and 50 amps.

Referring now to FIGS. 1-6, 7, 7A, 8 and 8A, exemplary embodiments of a locking blade type electrical receptacle as the electrical wiring device is shown. In these exemplary embodiments, the electrical wiring device 10 has a housing 20 and a plurality of contact assemblies 100, seen in detail in FIGS. 7, 7A, 8 and 8A, within the housing that are accessible from an exterior of the housing. The housing 20 has a main body 30, a front cover 50 and a rear cover 70. The front cover 50 is secured to one side of the main body 30 and the rear cover 70 is secured to the other side of the main body 30. The housing 20 is made of suitably rigid electrical insulating materials, such as plastic materials, and is configured to fit within an electrical box or enclosure. Non-limiting examples of plastic materials include injection molded thermoplastics, such as Nylon.

Figure 4:
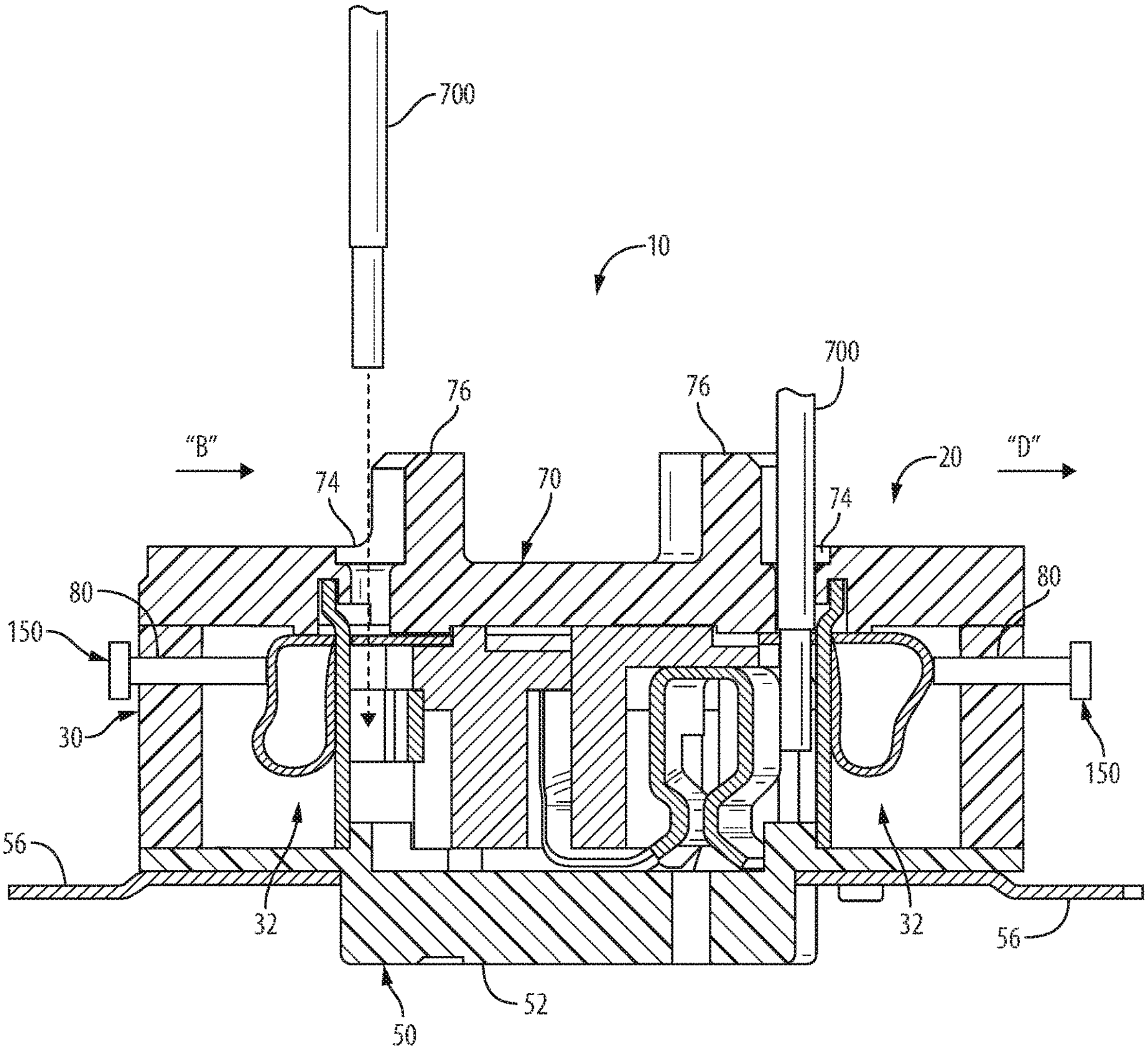
FIG. 4 is a cross sectional view of the electrical wiring device of FIG. 3 taken along line 4-4, illustrating a pushbutton activating member configured for horizontal movement.
Figure 5:
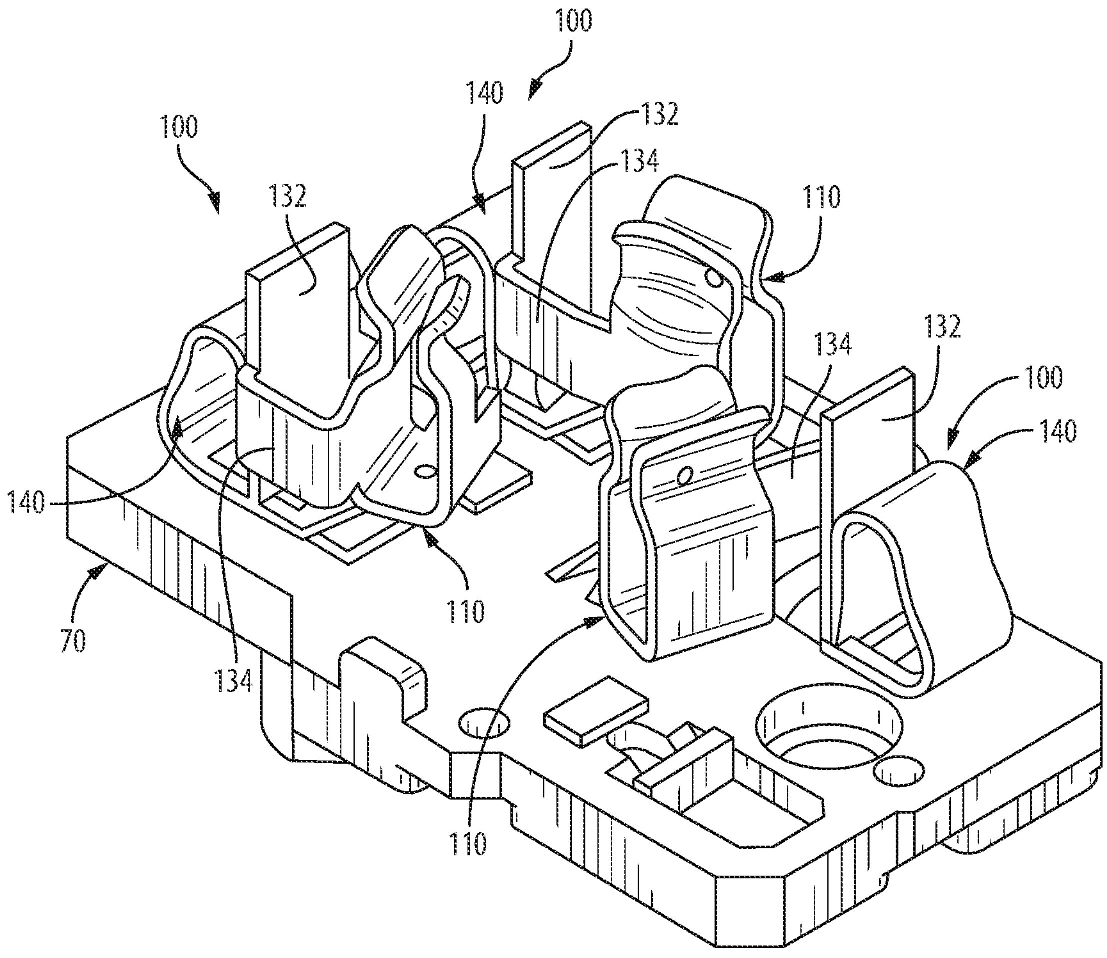
FIG. 5 is a top perspective view of a rear cover of the electrical wiring device housing of FIG. 1 with three contact assemblies resting on the rear cover.
Figure 6:
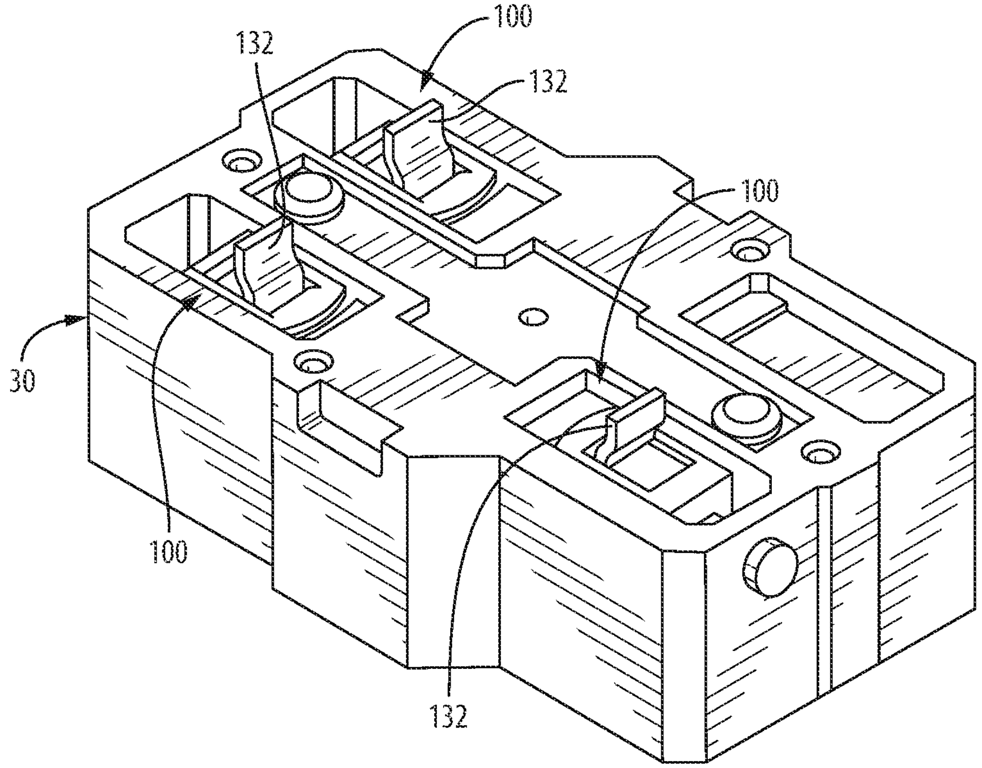
FIG. 6 is a bottom perspective view of a housing of the electrical wiring device of FIG. 1 having three cavities each housing a contact assembly.

The main body 30 includes a plurality of chambers or cavities 32, seen in FIG. 4. Each cavity 32 is configured to receive and position a contact assembly 100 within the main body 30, as shown in FIGS. 5 and 6. Each contact assembly 100 is configured to receive a wire, such as wire 700 shown in FIG. 4, and to mate with a contact blade of a plug connector. In the embodiment of FIG. 4, the main body 30 also includes a plurality of activating member openings 80 that permits a portion of an activating member 150, forming a portion of the contact assembly 100 described below, to extend outside the housing 20.

As shown in FIG. 1, the front cover 50 of the electrical wiring device 10 includes a face 52 having a plurality of blade-receiving slots or openings 54 through which contact blades of a plug connector can be inserted in the usual manner into adjacent cavities 32 within the main body 30. The front cover 50 has one or more mounting straps 56 that are secured to an exterior surface of the front cover using, for example, mechanical fasteners or adhesives. The mounting straps 56 are used to secure the electrical wiring device 10 to an electrical box via apertures 58 as is known. The mounting straps 56 may also be connected to electrical ground via a contact assembly 100 within the main body 30. The front cover 50 can be secured to the main body 30 using mechanical fasteners, adhesives or welds such as sonic welds.

Figure 2:
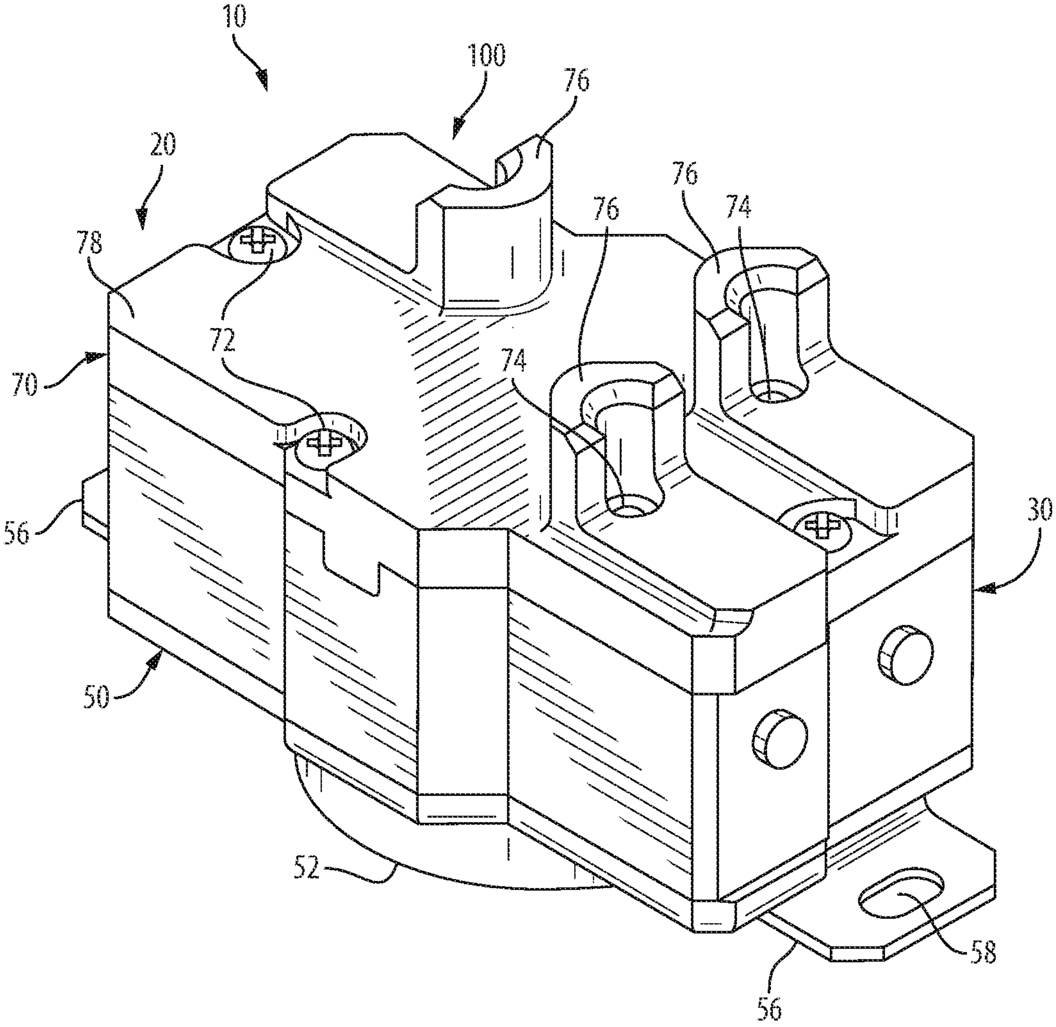
FIG. 2 is a bottom perspective view of the electrical wiring device of FIG. 1, illustrating a portion of a pushbutton activating member extending from a main body of a housing of the electrical wiring device.
Figure 3:
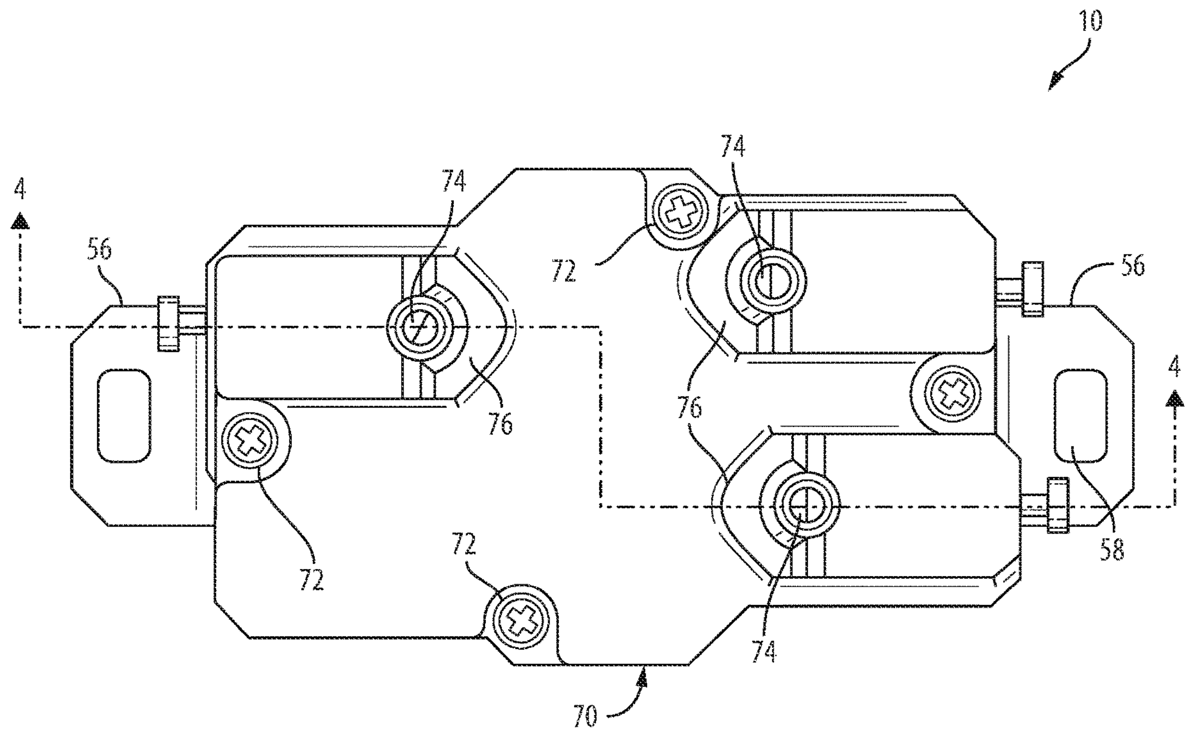
FIG. 3 is a bottom plan view of the electrical wiring device of FIG. 1.
Figure 4A:
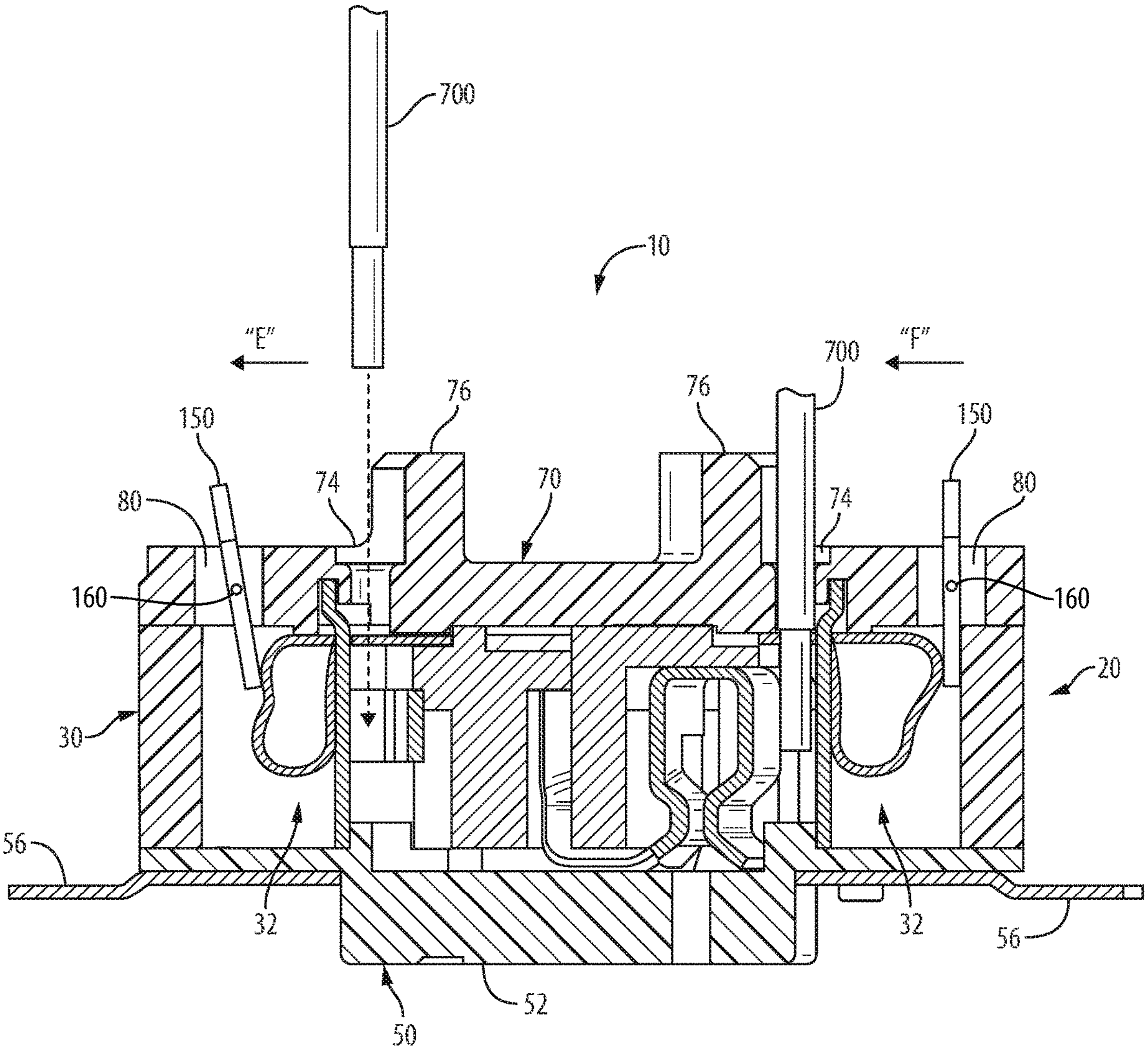
FIG. 4A is another cross sectional view of the electrical wiring device of FIG. 3 taken along line 4-4, illustrating a pushbutton activating member configured for rotational movement.

Referring to FIGS. 2-4, the rear cover 70 can be secured to the main body 30 using mechanical fasteners, such as screws 72, adhesives or welds such as sonic welds. The rear cover 70 includes a plurality of wire receiving apertures 74. Each wire receiving aperture 74 is positioned to align with a cavity 32 in the main body 30 so that a wire can pass through the rear cover 70 into a contact assembly 100 resting within a cavity 32 in the main body 30. The rear cover 70 may also include a plurality of wire guides 76 extending outwardly from an exterior surface 78 of the rear cover 70, as shown. In the embodiment shown, one wire guide 76 corresponds to one wire receiving aperture 74. Each wire guide 76 has an arcuate shape that corresponds to the round shape of a wire being inserted into the wire receiving aperture 74. In the embodiment of FIG. 4A, the rear cover 70 also includes a plurality of activating member openings 80 that permits a portion of an activating member 150, forming a portion of another exemplary embodiment of the contact assembly 100 described below, to extend outside the housing 20.

Turning to FIGS. 7 and 8 and FIGS. 7A and 8A, exemplary embodiments of a contact assembly 100 according to the present disclosure is shown. In these exemplary embodiments, the contact assembly 100 includes a contact member 110 and a wire terminal 130. The contact member 110 is made of an electrically conductive material, such as brass, copper or aluminum. The wire terminal 130 is made at least partially of an electrically conductive, such as brass, copper or aluminum. The wire terminal 130 may also be made at least partially of a resilient material with sufficient stiffness to flex when a force or mechanical energy, e.g., a mechanical load, is applied and can return, e.g., automatically return, to its normal position when the force or mechanical energy is removed. An example of such a resilient material is spring steel. The activating member 150 is made of suitably rigid electrical insulating materials, such as plastic materials. Non-limiting examples of a plastic materials include injection molded thermoplastics, such as Nylon. The contact member 110 and the wire terminal 130 can be formed as a unitary structure, or the contact member and wire terminal can be individual components secured together by, for example, solder joints, brazed joints, or welded joints. The activating member 150 is configured to selectively interact with the respective wire terminal 130 to secure, clamp, connect, couple, bind and/or squeeze one or more wires to the wire terminal.

In this exemplary embodiment, the contact member 110 includes a contact body 112 and a pair of flexible fingers 114 and 116 extending from the contact body 112, as shown. The flexible fingers 114 and 116 form a female contact configured to engage a contact blade of a blade-type electrical power cord plug. The distal ends of the flexible fingers 114 and 116 contact each other or are in close proximity to each other to form a gripping portion 118 between the fingers. The gripping portion 118 is capable of receiving a contact blade so as to electrically couple or connect the contact member 110 to the contact blade. Thus, each contact assembly 100 is adapted to engage one of a plurality of contact blades of a blade-type electrical power cord plug.

The wire terminal 130 is a terminal that uses one or more force applying members 136 configured to apply mechanically generated energy to secure, clamp, connect, couple, bind and/or squeeze one or more wires, e.g., wire 700 shown in FIGS. 4 and 4A, to the wire terminal 130, and to be released to permit the one or more wires to be inserted into or removed from the wire terminal 130. The energy stored by the one or more force applying members 136 should be sufficient to apply a constant and continuous force to mechanically secure, connect, couple and/or clamp the one or more wires to the wire terminal 130. In the embodiments described herein, the wire terminal 130 is a mechanical clamping terminal and the one or more force applying members 136 includes one or more springs that can deflect when a force or mechanical energy is applied to the one or more springs. Non-limiting examples of the one or more springs include clamp springs. The springs may also be referred to herein as "clamp springs" in the plural or "clamp spring" in the singular. In the embodiments described herein, the one or more springs 136 can defect under a force or mechanical energy, e.g., a mechanical load, applied by the activating member 150 and recover to their initial shape when the force or mechanical energy is removed. The energy stored by the one or more force applying members 136 should be sufficient to apply a constant and continuous force to mechanically secure, clamp, connect, couple, bind and/or squeeze one or more wires 700 to the wire terminal 130. A non-limiting example of the constant and continuous force against an electrical conductor to electrically connect the electrical conductor to the clamp brace is in the range of about 5 pounds force and about 35 pounds force.

Figure 7:
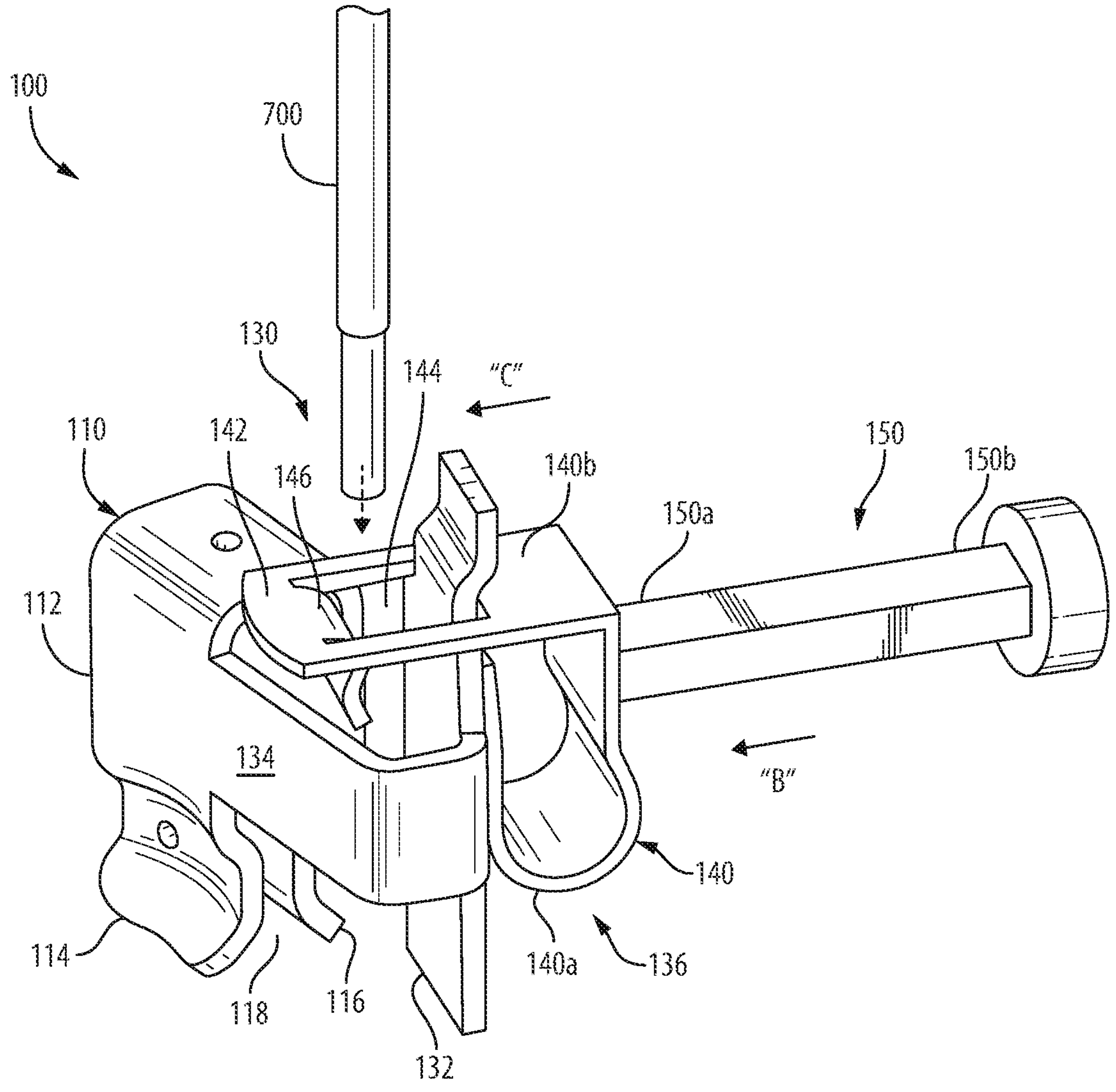
FIG. 7 is a top perspective view of an exemplary embodiment of a screwless wire terminal according to the present disclosure for the electrical wiring device of FIG. 1 in an open position, and illustrating the pushbutton activating member configured for horizontal movement.
Figure 8:
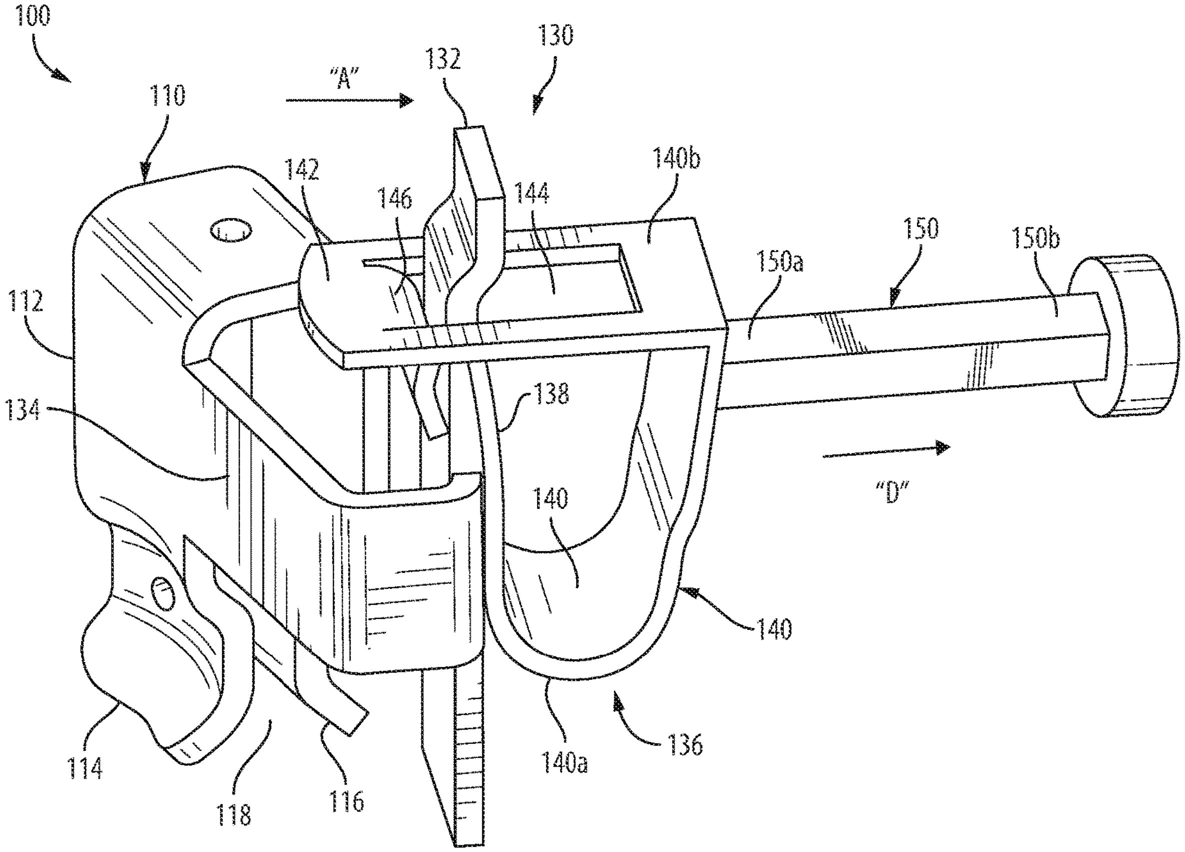
FIG. 8 is a top perspective view of the screwless wire terminal of FIG. 7 in a closed position, and illustrating the pushbutton activating member configured for horizontal movement.

In the exemplary configuration shown in FIGS. 4, 7 and 8, the wire terminal 130 includes a clamp brace 132 and a force applying member 136. The clamp brace 132 is an electrically conductive fixed terminal body that may be a substantially planar shaped member or an arcuate shaped member. The contact body 112 or the wire terminal 130 may include a contact arm 134. In either instance, the clamp brace 132 may be secured to the contact body 112 of the contact member 110 via the contact arm 134. The contact arm 134 also provides an electrically conductive path between the contact member 110 and at least a portion of the wire terminal 130, e.g., the clamp brace. The force applying member 136 includes an end portion 138, a spring member 140 and a clamp arm 142. The force applying member 136 is an exemplary embodiment of a force applying member described above. The end portion 138 can be a substantially planar shaped member or an arcuate shaped member that is configured to mate with the clamp brace 132 and is secured to the clamp brace by, for example, mechanically fitting, e.g., clipping, the end portion 138 to the clamp brace 132, or by soldering, brazing or a welding the end portion 138 to the clamp brace 132. The spring member 140 has a first lobe 140*a* and a second lobe 140*b*. In this embodiment, the second lobe 140*b* is configured to interact with the activating member 150 so that movement, e.g., pivoting, horizontal or vertical movement, of the activating member 150 relative to the spring member 140 exerts a force or mechanical energy, e.g., a mechanical load, on the spring member 140. For example, the activating member 150 can be a shaped member, such as a symmetrically or asymmetrically shaped member, e.g., a cylindrical or rectangular shaped member, having a distal end 150*a* and a proximal end 150*b*. The distal end 150*a* may be secured to the second lobe 140*b* or may be configured to contact the second lobe 140*b* of the spring member 140, as shown in FIG. 7. As noted above, in the exemplary embodiment shown, the activating member 150 may be a pushbutton mechanism such that when the proximal end 150*b* of the activating member 150 is manually depressed, the activating member 150 moves in the direction of arrow "B" applying a force or mechanical energy on the spring member 140. Applying a force or mechanical energy to the spring member 140 causes the spring member 140 to deflect in the direction of arrow "C" toward the open position, seen in FIG. 7. When the proximal end 150*b* of the activating member 150 is released, the force or mechanical energy applied to the spring member 140 is released. When the force or mechanical energy applied to the spring member 140 is released, the spring member 140 automatically moves from the open position to its normal closed position, seen in FIG. 8, and the activating member 150 is moved in the direction of arrow "D".

Figure 7A:
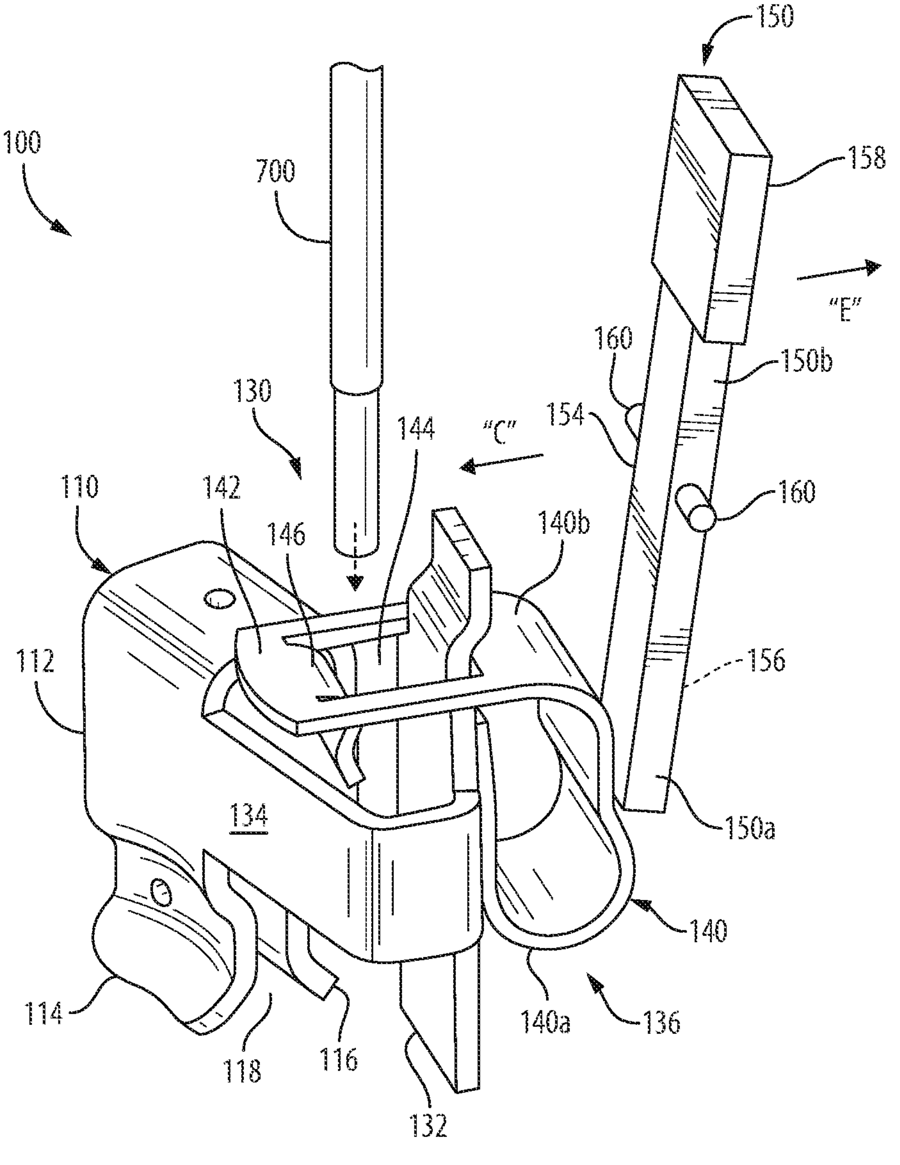
FIG. 7A is a top perspective view of another exemplary embodiment of a screwless wire terminal according to the present disclosure for the electrical wiring device of FIG. 1 in an open position, and illustrating the pushbutton activating member configured for rotational movement.
Figure 8A:
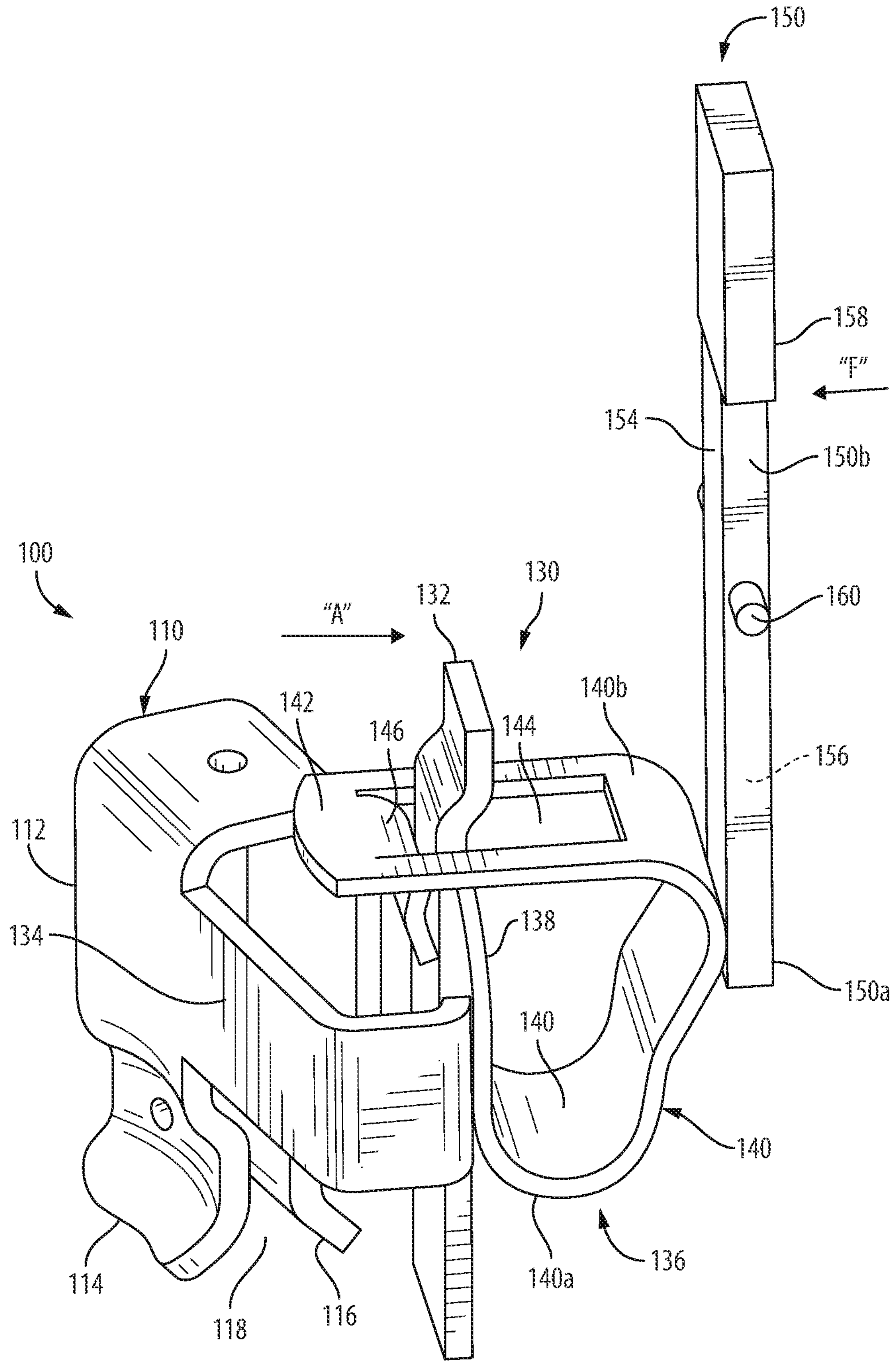
FIG. 8A is a top perspective view of the screwless wire terminal of FIG. 7A in a closed position, and illustrating the sub-pushbutton activating member configured for rotational movement.

In the exemplary configuration shown in FIGS. 4A, 7A and 8A, the wire terminal 130 is substantially similar to the wire terminal of FIGS. 7 and 8, except the activating member 150 and its operation is configured for rotational or pivotable movement, as described below. In this embodiment, the second lobe 140*b* is configured to interact with the activating member 150 so that movement, e.g., rotational or pivotal movement, of the activating member 150 relative to the spring member 140 is translated to the application of a force or mechanical energy on the spring member 140 or the removal of the force or mechanical energy on the spring member 140. For example, the activating member 150 can be a shaped member, such as a symmetrically or asymmetrically shaped member, e.g., a T-shaped member, a cylindrical member or rectangular shaped member, having a distal end 150*a*, a proximal end 150*b*, a first face 154 and a second face 156. In this embodiment, the proximal end 150*b* of the activating member 150 includes a thumb paddle 158 configured so that an electrician can move, e.g., rotate or pivot, the activating member 150. The activating member 150 is rotatably or pivotable secured to the housing 20 using one or more pivot pins 160 as shown in FIGS. 4A and 7A. In the exemplary embodiment of FIG. 4A, the activating member 150 is rotatably or pivotable secured to rear cover 70 of the housing 20 such that the thumb pad 158 extends from the rear cover and the distal end 150*a* of the activating member 150 is within the cavity 32 so that a portion of the first face 154 may be secured to the second lobe 140*b* of the spring member 140 or may be configured to contact the second lobe 140*b*. To apply a force or mechanical energy on the spring member 140 to move the spring member 140 from the closed position to the open position, the thumb pad 158 is manually moved, e.g., rotated or pivoted, in the direction of arrow "E", shown in FIG. 4A. As the thumb pad 158 is moved, the portion of the first face 154, seen in FIGS. 7A and 8A, in contact with the second lobe 140*b* of the spring member 140 applies a force or mechanical energy to the spring member 140 in a direction of arrow "C" causing the spring member 140 to deflect in the direction of arrow "C" toward the open position, seen in FIG. 7A. When the thumb pad 158 of the activating member 150 is released, the force or mechanical energy applied to the spring member 140 is released. When the force or mechanical energy applied to the spring member 140 is released, the spring member 140 automatically moves from the open position to its normal closed position, seen in FIG. 8A, and the activating member 150 is moved in the direction of arrow "F" seen in FIGS. 4A and 8A.

The clamp arm 142 extends from the second lobe 140*b* of the spring member 140 toward the clamp brace 132, as shown. The clamp arm 142 has an elongated opening 144 configured to receive a portion of the clamp brace 132 and a wire pressing member 146 that contacts a wire, e.g., wire 700 seen in FIG. 4, positioned between the clamp brace 132 and the wire pressing member 146 when the force applying member 136 is in the closed position. The wire pressing member 146 may also be referred to herein as a tang. The clamp arm 142 is movable relative to the clamp brace 132 between the closed position, seen in FIG. 7, and the open position, seen in FIG. 8.

As noted, the wire terminal 130 can connect to electrical conductors of different sizes. For example, if the electrical wiring device 10 is rated for 15 amps, then the wire terminal 130 should also be configured and rated for at least 15 amps. The wire size, i.e., the bare conductor size, for 15 amps is 14 AWG wire such that the clamp arm 142 should be able to move to an open position where the outer diameter of 14 AWG wire can fit into the opening 144 of the clamp arm 142. As another example, if the electrical wiring device is rated for 20 amps, then the wire terminal 130 should also be rated for at least 20 amps. The wire size, i.e., the bare conductor size, for 20 amps is 12 AWG wire such that the clamp arm 142 should be able to move to an open position where the outer diameter of 12 AWG wire can fit into the opening 144 of the clamp arm 142. As another example, if the electrical wiring device is rated for 30 amps, then the wire terminal 130 should also be rated for at least 30 amps. The wire size, i.e., the bare conductor size, for 30 amps is 10 AWG wire such that the clamp arm 142 should be able to move to an open position where the outer diameter of 10 AWG wire can fit into the opening 144 of the clamp arm 142. As another example, if the electrical wiring device is rated for 40 amps, then the wire terminal 130 should also be rated for at least 40 amps. The wire size, i.e., the bare conductor size, for 40 amps is 8 AWG wire such that the clamp arm 142 should be able to move to an open position where the outer diameter of 8 AWG wire can fit into the opening 144 of the clamp arm 142. As another example, if the electrical wiring device is rated for 50 amps, then the wire terminal 130 should also be rated for at least 50 amps. The wire size, i.e., the bare conductor size, for 50 amps is 6 AWG wire such that the clamp arm 142 should be able to move to an open position where the outer diameter of 6 AWG wire can fit into the opening 144 of the clamp arm 142.

As noted, the spring member 140 is made of an electrically conductive resilient material with sufficient stiffness to flex when the activating member 150 pushes the spring member 140 from the closed position to the open position while applying a force (e.g., a spring force) or mechanical energy through the wire pressing member 146 to a wire between the wire pressing member and the clamp brace 132. As an example, the spring member 140 can be made of metal, such as spring steel. The force, e.g., the spring force, or mechanical energy exerted by the spring member 140 clamping a wire between the wire pressing member 146 and the clamp brace 132 should be sufficient to apply a constant and continuous force on the wire 700 to electrically couple, secure, clamp and/or connect the wire terminal 130 to the wire, e.g., wire 700, in various temperature and environmental conditions. The spring member 140 is configured so that it is normally biased toward the closed position, i.e., in the direction of arrow "A" which is away from the clamp brace 132, as seen in FIG. 7. In the spring member's normal position without a conductor inserted into the elongated opening 144, the wire pressing member 146 of the clamp arm 142 can contact the clamp brace 132.

As described herein, the electrical wiring device 10 uses contact assemblies 100 to terminate electrical conductors or wires within an electrical box or enclosure. Referring to the embodiment of FIGS. 4, 7 and 8, to connect wires within an electrical box or enclosure to the electrical wiring device 10, an installer, e.g., an electrician, strips the insulation from the end of each wire. In this exemplary embodiment, the electrical wiring device 10 has three contact assemblies 100 such that three wires can be connected to the electrical wiring device. However, it is also contemplated that the electrical wiring device may have less than three contact assemblies 100 or more than three contact assemblies 100. Further, it is also contemplated that each contact assembly could be configured to electrically connect more than one wire to the contact assembly 100. The activating members 150 for each contact assembly 100 extending through the main body 30 of the housing 20 are then moved, e.g., horizontally moved, relative to a longitudinal axis of the electrical wiring device 10 or moved relative to the clamp brace 132. For clarity, in the embodiment shown, the activating member 150 is moved in the direction of arrow "B" seen in FIG. 7, to apply a force or mechanical energy on the spring member 140. Applying a force or mechanical energy to the spring member 140 causes the spring member 140 to deflect in the direction of arrow "C" toward the open position, seen in FIG. 7. With the wire terminals 130 in the open position, the electrical wires are then inserted into the appropriate wire receiving aperture 74 in the rear cover 70 of the electrical wiring device 10. The wire receiving apertures 74 and wire guides 76 guide the bare end of the wires into the portion of the elongated opening 144 of the force applying member 136 between clamp brace 132 and wire pressing member 146. When the bare end of each wire is positioned between the clamp brace 132 and the wire pressing member 146, the proximal end 150*b* of the respective activating member 150 is then released removing the force or mechanical energy applied by the activating member 150 on the spring member 140 so that the spring member 140 automatically moves from the open position to its normal closed position, seen in FIG. 8, and the activating member 150 is moved in the direction of arrow "D". Returning the spring member 140 to the closed position secures, clamps, couples, connects, binds and/or squeezes the wire between the clamp brace 132 and the wire pressing member 146 completing an electrically conductive path between the wire and the contact member 110.

To remove the wires from the contact assembly 100, the proximal end 150*b* of the activating member 150 for each contact assembly 100 is moved, e.g., horizontally moved, relative to a longitudinal axis of the electrical wiring device 10 or is moved relative to the clamp brace 132. For clarity, in the embodiment shown, the activating member 150 is moved in the direction of arrow "B" seen in FIG. 7, to apply a force or mechanical energy on the spring member 140. Applying a force or mechanical energy to the spring member 140 causes the spring member 140 to deflect in the direction of arrow "C" toward the open position, seen in FIG. 7. With the wire terminals 130 in the open position, the electrical wires can then be removed.

As described herein, the electrical wiring device 10 uses contact assemblies 100 to terminate electrical conductors or wires within an electrical box or enclosure. Referring to the embodiment of FIGS. 4A, 7A and 8A, to connect wires within an electrical box to the electrical wiring device 10, an installer, e.g., an electrician, strips the insulation from the end of each wire. In this exemplary embodiment, the electrical wiring device 10 has three contact assemblies 100 such that three wires can be connected to the electrical wiring device. However, it is also contemplated that each contact assembly could be configured to electrically connect more than one wire to the contact assembly 100. The thumb pads 158 for the activating members 150 for each contact assembly 100 extending from the rear cover 70 are then moved, e.g., rotatably or pivoted moved, relative to a longitudinal axis of the electrical wiring device 10, i.e., in the direction of arrow "E" seen in FIG. 7A. As the thumb pad 158 is moved, the portion of the first face 154 in contact with the second lobe 140*b* of the spring member 140 applies a force or mechanical energy to the spring member 140 in a direction of arrow "C", seen in FIG. 7A, causing the spring member 140 to deflect in the direction of arrow "C" toward the open position. With the wire terminals 130 in the open position, the electrical wires are then inserted into the appropriate wire receiving aperture 74 in the rear cover 70 of the electrical wiring device 10. The wire receiving apertures 74 and wire guides 76 guide the bare end of the wires into the portion of the elongated opening 144 of the force applying member 136 between clamp brace 132 and wire pressing member 146. When the bare end of each wire is positioned between the clamp brace 132 and the wire pressing member 146, the thumb pad 158 of the respective activating members 150 is then released When the thumb pad 158 of the activating member 150 is released removing the force or mechanical energy applied to the spring member 140. When the force or mechanical energy applied to the spring member 140 is released, the spring member 140 automatically moves from the open position to its normal closed position, seen in FIG. 8A, securing, clamping, coupling and/or connecting the wire between the clamp brace 132 and the wire pressing member 146 completing an electrically conductive path between the wire and the contact member 110. In addition, the activating member 150 is moved in the direction of arrow "F" seen in FIGS. 4A and 8A.

To remove the wires from the contact assembly 100, the thumb pads 158 for the activating members 150 for each contact assembly 100 is moved, e.g., rotatably or pivoted moved, relative to a longitudinal axis of the electrical wiring device 10 or moved relative to the clamp brace 132. For clarity, in the embodiment shown, the activating member is moved in the direction of arrow "E" applying a force or mechanical energy on the spring member 140 causing the spring member 140 to deflect in the direction of arrow "C" from the closed position toward the open position. With the wire terminals 130 in the open position, the electrical wires can then be removed.

Figure 9:
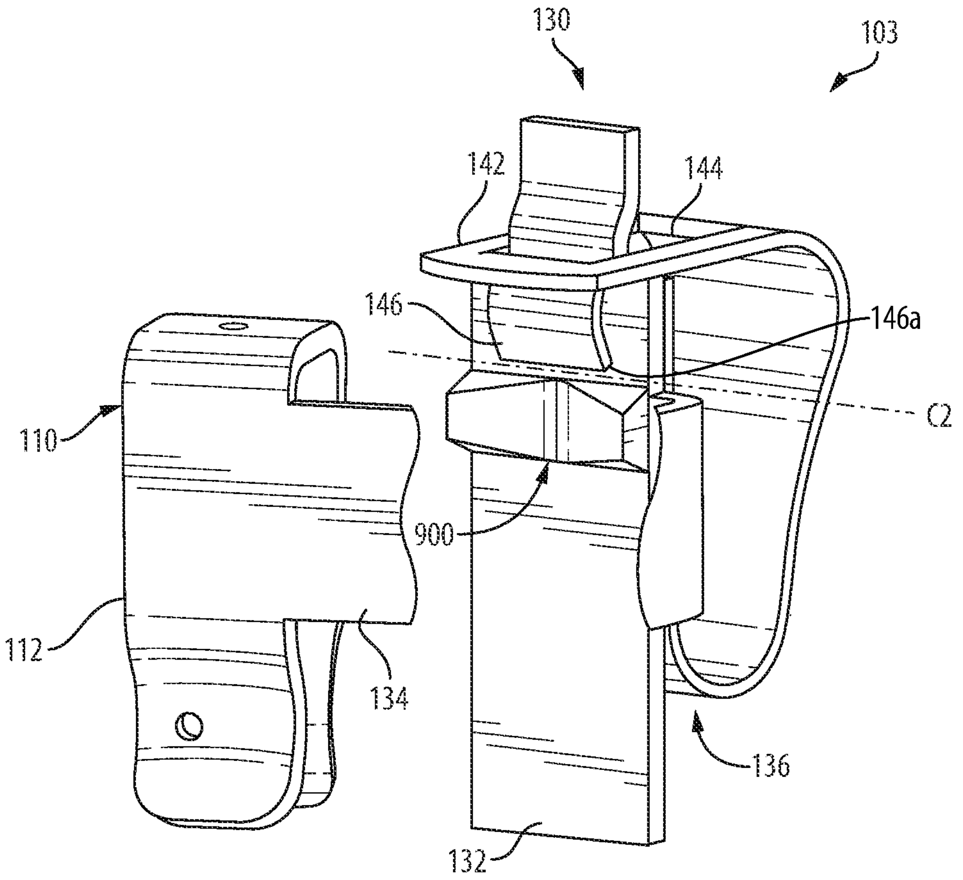
FIG. 9 is a perspective view of another exemplary embodiment of a screwless wire terminal for the electrical wiring device of FIG. 1, illustrating a wire manager secured to a clamp brace of a wire terminal.
Figure 10:
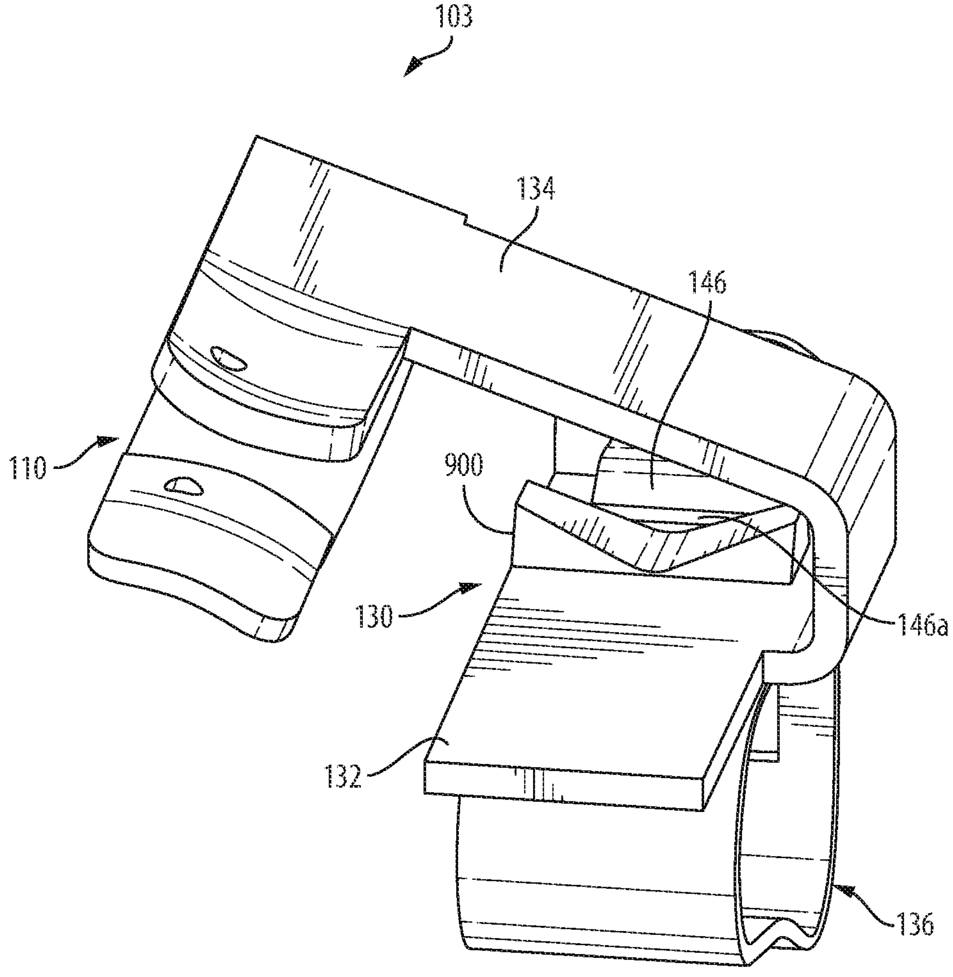
FIG. 10 is a bottom perspective view of the screwless wire terminal of FIG. 9, illustrating the wire manager secured to the clamp brace.
Figure 11:
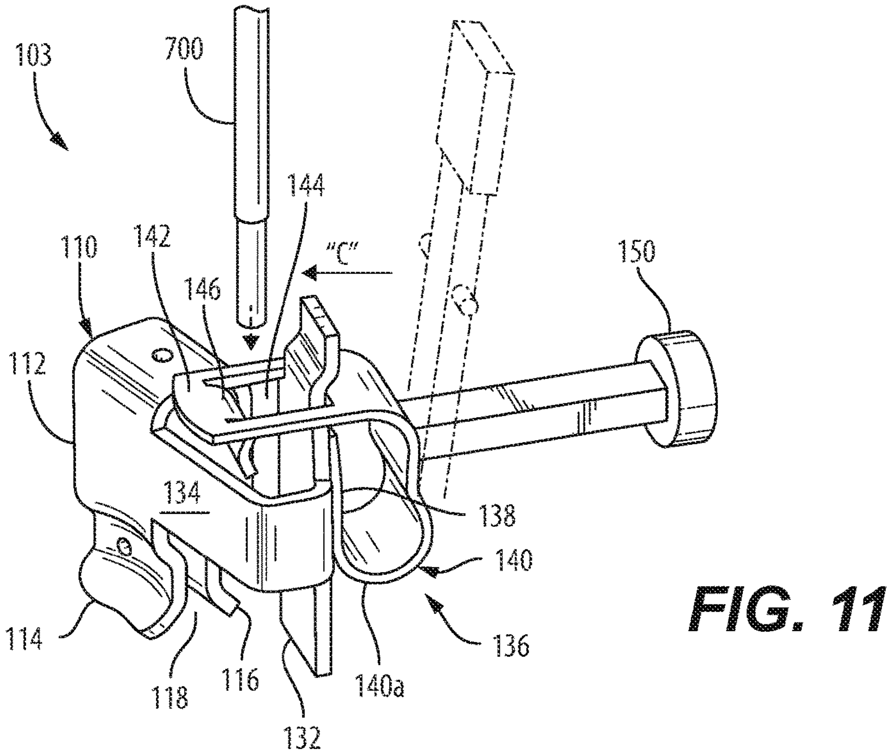
FIG. 11 is a top perspective view of the screwless wire terminal of FIG. 9 in an open position and illustrating a stranded wire ready for insertion into the screwless wire terminal.
Figure 12:
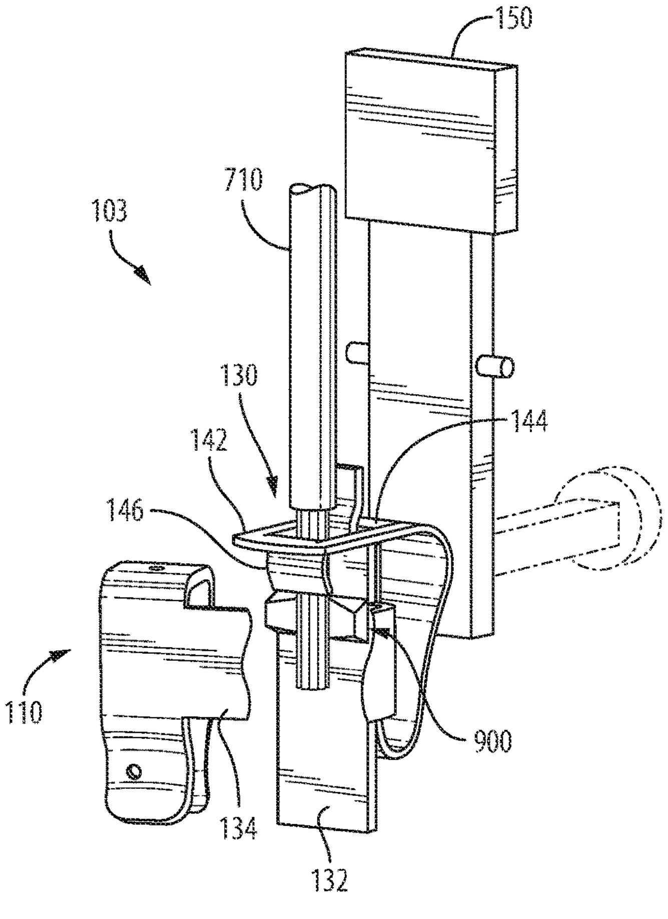
FIG. 12 is a perspective view of the screwless wire terminal of FIG. 11 with the stranded wire inserted into the screwless wire terminal and the stranded wire resting in the wire manager.
Figure 13:
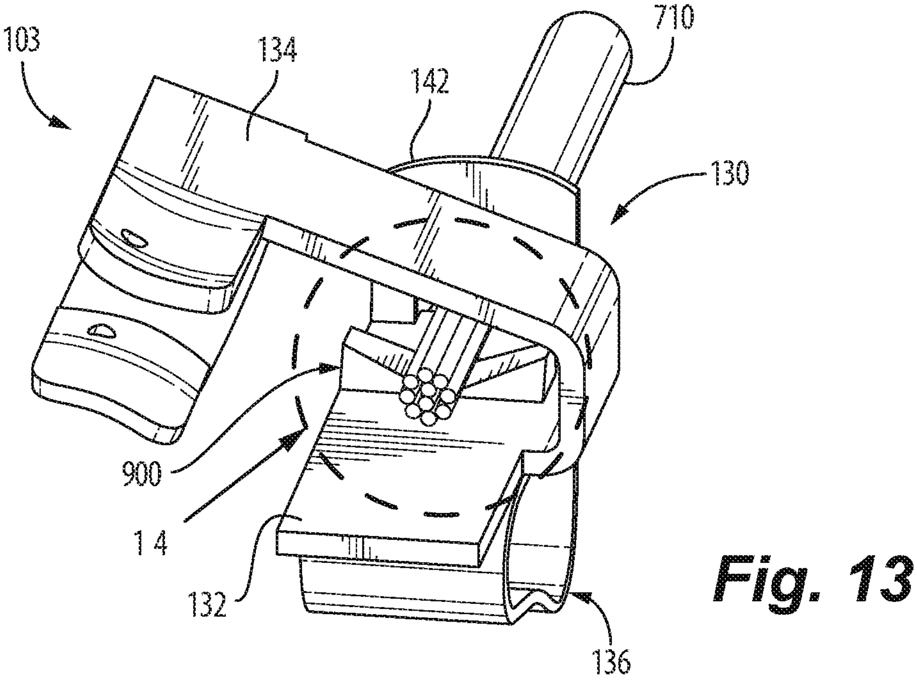
FIG. 13 is a bottom perspective view of the screwless wire terminal of FIG. 12, illustrating the screwless wire terminal in the closed position and the stranded wire resting in the wire manager.
Figure 14:
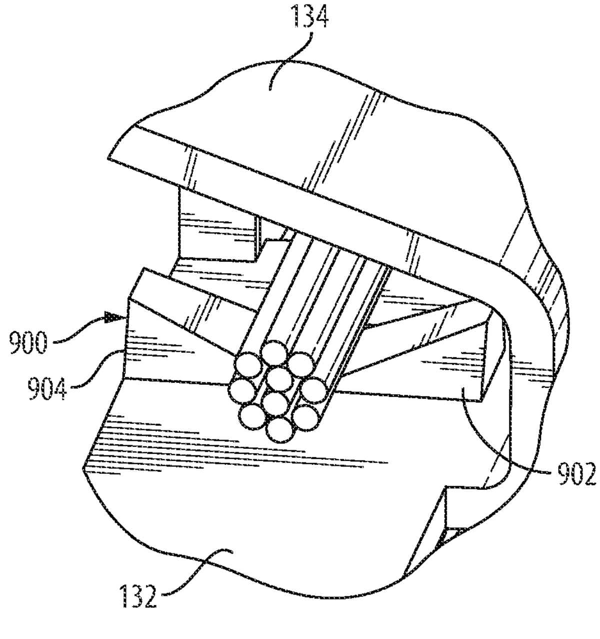
FIG. 14 is an enlarged perspective view of a portion of the screwless wire terminal of FIG. 13 taken from detail 14, illustrating the stranded wire resting in the wire manager.

Another exemplary embodiment of a contact assembly 103 according to the present disclosure that may be used with the electrical wiring devices contemplated by the present disclosure, e.g., the electrical wiring device 10 described above, is shown in FIGS. 9-14. The contact assembly 103 is substantially similar to the contact assembly 100 such that like reference numerals are used to reference like components. The contact assembly 103 includes the contact member 110, the wire terminal 130 and the plunger 150. For ease of description, the activating member 150 is not shown in FIGS. 9, 10 and 13. The wire terminal 130 includes the clamp brace 132 and the force applying member 136. A contact arm 134 may be connected between the contact member 110 and the clamp brace 132. In this exemplary embodiment, the clamp brace 132 has a wire manager 900 integrally or monolithically formed into the clamp brace 132. In another embodiment, the wire manager 900 may be secured to the clamp brace 132 by, for example, a solder joint, a brazed joint or a welded joint. The wire manager 900 is provided to urge the solid wire 700 or stranded wire 710 so that the wire is concentrated toward a center or middle of the clamp brace 132 and/or a center or middle of the wire pressing member 146. Preferably, the wire manager 900 is provided to urge strands of stranded wire 710 so that the wire strands are concentrated toward a center or middle the clamp brace 132 and/or a center or middle of the wire pressing member 146. Concentrating the strands of stranded wire 710 toward a middle the clamp brace 132 and/or a middle of the wire pressing member 146 increases the force or mechanical energy applied by the wire pressing member 146 of the clamp arm 142 of the force applying member 136 to the wire. For example, concentrating the wire 700 or 710 toward a middle the clamp brace 132 and/or a middle of the wire pressing member 146 can increase the force or mechanical energy applied by the wire pressing member 146 by, for example, about 20 percent when compared to instances where the stranded wire is not concentrated wire toward a center or middle the clamp brace 132 and/or a center or middle of the wire pressing member 146. This results in a higher wire retention force in the range of about 1 pound force and about 7 pound force that can be applied by the force applying member 136 to hold the wire, e.g., the strands of the stranded wire 710, against the clamp brace 132. To illustrate, in the example where the energy stored by the one or more force applying members 136 should be sufficient to apply a constant and continuous force, the force should be in the range of, for example, about 5 pound force to about 35 pound force. In such an example, the higher wire retention force would be in the range of, for example, 6 pound force to about 42 pound force. In addition, the higher force or mechanical energy on the wire 700 or 710 also provides an improved electrical connection by lowering the contact resistance. Exemplary embodiments of the wire manager 900 are shown in FIGS. 15-19 and are described herein below. However, the present disclosure contemplates other wire manager embodiments where the wire manager urges a wire or wire strands toward a center or middle of a clamp brace and/or a center or middle of the wire pressing member.

Figure 15:
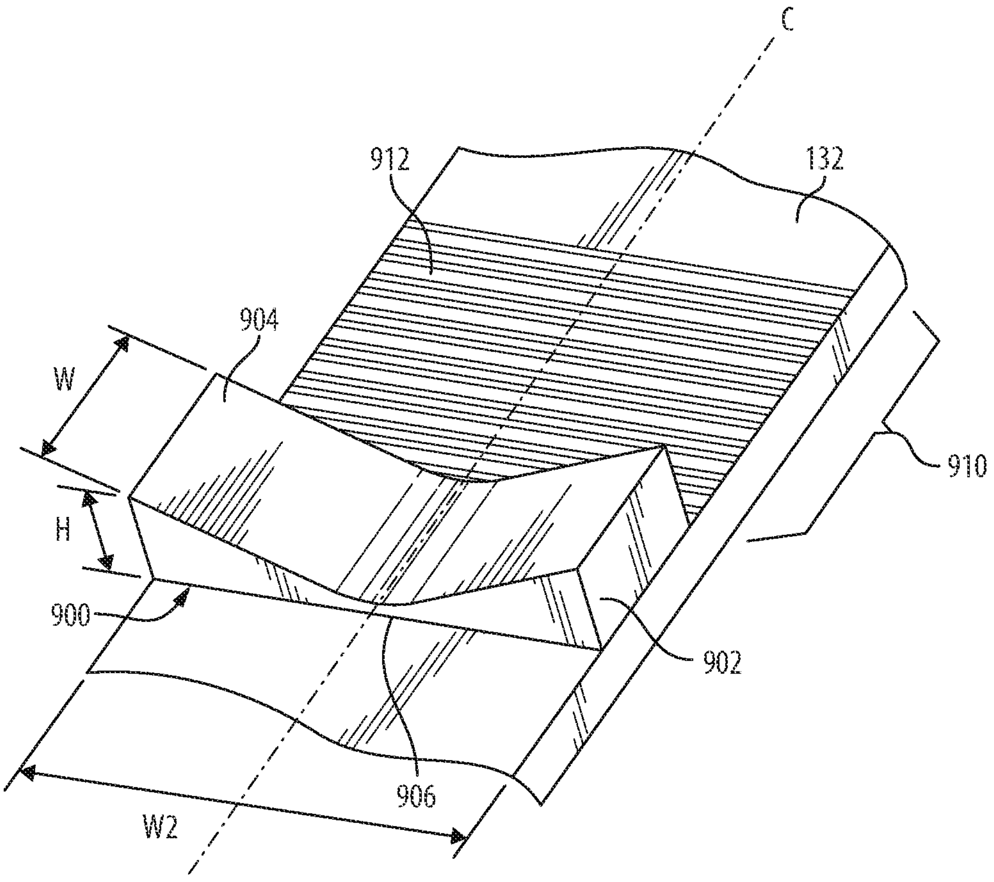
FIG. 15 is a perspective view of another exemplary embodiment of a wire manager secured to the clamp brace, and illustrating a portion of a surface of the clamp brace with a textured surface in the form of striations.

In the exemplary embodiment shown in FIG. 15, the wire manager 900 is a V-shape like structure formed with a pair of wedges 902 and 904 joined by a rounded valley 906. The wedges 902 and 904 may be symmetrically shaped wedges or asymmetrically shaped wedges. In the embodiment shown, the wedges 902 and 904 are symmetrically shaped wedges having a height "H" and a width "W." Preferably, the height "H" is in the range of, for example, about 0.05" and about 0.15", and the width "W" is in the range of, for example, about 0.1" and about 0.2". The wire manager 900 may extend along an entire width "W2" of the clamp brace 132 or the wire manager 900 may extend along a portion of the width "W2" of the clamp brace 132. In the embodiment shown, the wire manager 900 extends along the entire width "W2" of the clamp brace 132 with the rounded valley 906 positioned at or in close proximity to a center line "C" of the clamp brace 132. The wire manager 900 is also positioned on the clamp brace 132 so that the wire manager 900 does not interfere with the wire pressing member 146 contacting the exposed conductor of the wire, e.g., the strands of the stranded wire 710. For example, the wire manager 900 may be positioned so that the wire manager 900 is in close proximity to a contact line "C2," seen in FIG. 9, were a distal end 146*a* of the wire pressing member 146 would contact the clamp brace 132 when the clamp brace is in the closed position and no wire is inserted into the elongated opening 144 of the wire terminal 130. In addition, a contact area 910 of the clamp brace 132 may include a textured surface 912 that is provided to grip the exposed wire strands or solid wire, e.g., the exposed strands of stranded wire 710, to improve the wire retention force applied to the exposed wire strands or solid wire by the wire pressing member 146. The contact area 910 is at least a portion of the clamp brace 132 where the wire pressing member 146 would contact the clamp brace 132 when the clamp brace is in the closed position and no wire 700 or 710 is inserted into the elongated opening 144 of the wire terminal 130. In the embodiment of FIG. 15, the textured surface 912 is striations.

Figure 16:
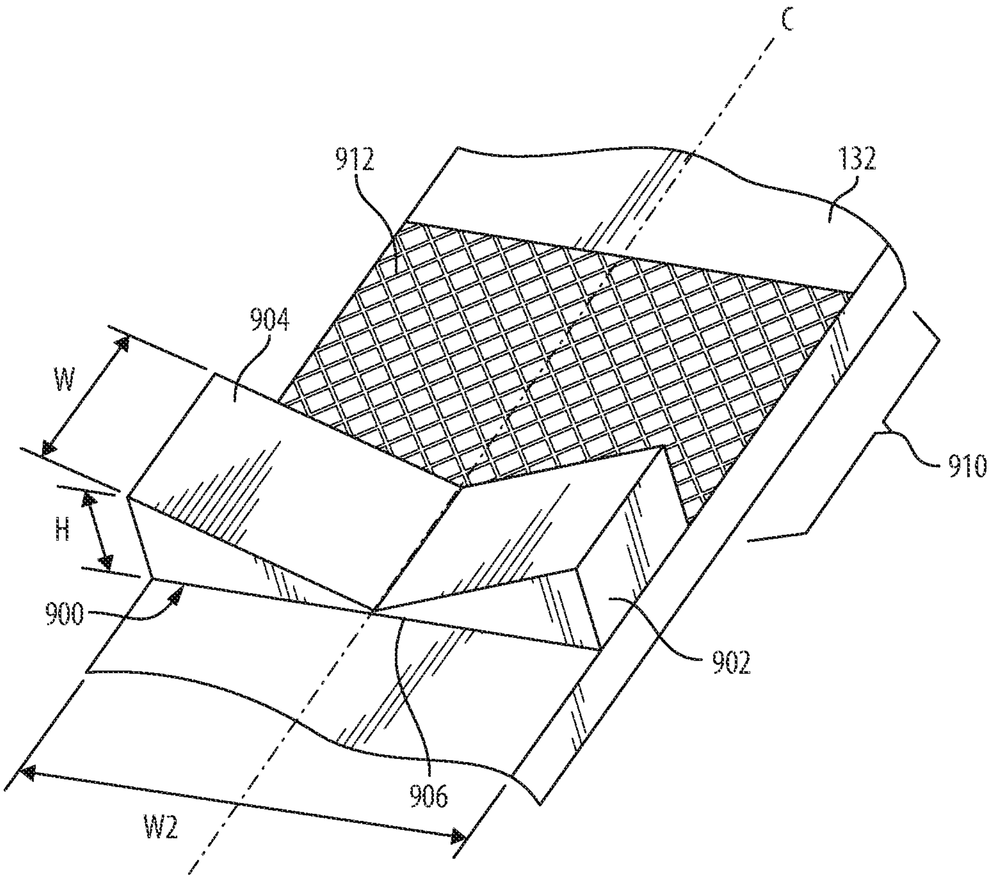
FIG. 16 is a perspective view of another exemplary embodiment of a wire manager secured to the clamp brace, and illustrating a portion of a surface of the clamp brace with a textured surface in the form of knurling.

In the exemplary embodiment shown in FIG. 16, the wire manager 900 is also a V-shape like structure formed with a pair of wedges 902 and 904. However, in the embodiment of FIG. 16, the wedges 902 and 904 are joined at their narrow end forming a sharp valley 906, as shown. The wedges 902 and 904 may be symmetrically shaped wedges or asymmetrically shaped wedges. In the embodiment shown, the wedges 902 and 904 are symmetrically shaped wedges having a height "H" and a width "W." As a non-limiting example, the height "H" may be in the range of, for example, about 0.05" and about 0.15", and the width "W" may be in the range of, for example, about 0.1" and about 0.2". The wire manager 900 may extend along an entire width "W2" of the clamp brace 132 or the wire manager 900 may extend along a portion of the width "W2" of the clamp brace 132. In the embodiment shown, the wire manager 900 extends along the entire width "W2" of the clamp brace 132 with the sharp valley 906 positioned at or in close proximity to the center line "C" of the clamp brace 132. The wire manager 900 is also positioned on the clamp brace 132 so that the wire manager 900 does not interfere with the wire pressing member 146 contacting the exposed conductor of the wire, e.g., the strands of the stranded wire 710. For example, the wire manager 900 may be positioned so that the wire manager 900 is in close proximity to the contact line "C2," shown in FIG. 9, were the distal end 146*a* of the wire pressing member 146 would contact the clamp brace 132 when the clamp brace is in the closed position and no wire is inserted into the elongated opening 144 of the wire terminal 130. In addition, a contact area 910 of the clamp brace 132 may include the textured surface 912 that is provided to grip the exposed wire strands or solid wire, e.g., the exposed strands of stranded wire 710, to improve the wire retention force applied to the exposed wire strands by the wire pressing member 146. The contact area 910 is at least a portion of the clamp brace 132 where the wire pressing member 146 would contact the clamp brace 132 when the clamp brace is in the closed position and no wire is inserted into the elongated opening 144 of the wire terminal 130. In the embodiment of FIG. 16, the textured surface 912 is knurling.

Figure 17:
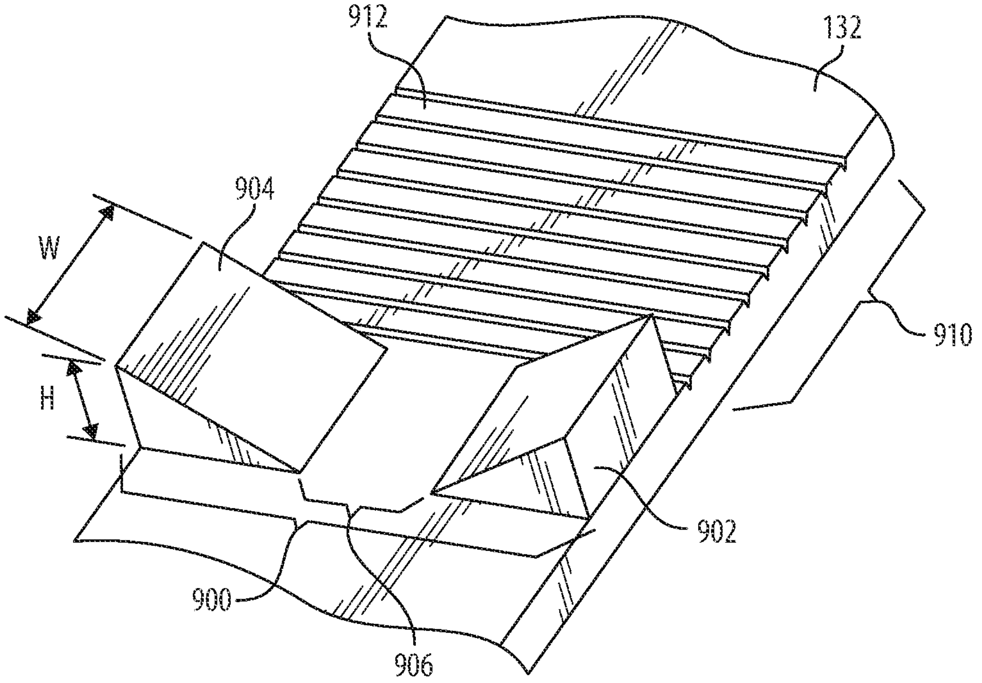
FIG. 17 is a perspective view of another exemplary embodiment of a wire manager secured to the clamp brace, and illustrating a portion of a surface of the clamp brace with a textured surface in the form of shallow grooves.

In the exemplary embodiment shown in FIG. 17, the wire manager 900 is also a V-shape like structure formed with a pair of wedges 902 and 904. However, in the embodiment of FIG. 17, the wedges 902 and 904 are spaced apart so that a portion of the clamp brace 132 forms the valley 906, as shown. The wedges 902 and 904 may be symmetrically shaped wedges or asymmetrically shaped wedges. In the embodiment shown, the wedges 902 and 904 are symmetrically shaped wedges having a height "H" and a width "W." As a non-limiting example, the height "H" may be in the range of, for example, about 0.05" and about 0.15", and the width "W" may be in the range of, for example, about 0.1" and about 0.2". The wire manager 900 may extend along an entire width "W2" of the clamp brace 132, or the wire manager 900 may extend along a portion of the width "W2" of the clamp brace 132. In the embodiment shown, the wire manager 900 extends along a portion of the width "W2" of the clamp brace 132 with the portion of the clamp brace forming the valley 906. Preferably, the valley 906 is positioned at or in close proximity to a center or middle of the clamp brace 132. The wire manager 900 is also positioned on the clamp brace 132 so that the wire manager 900 does not interfere with the wire pressing member 146 contacting the exposed conductor of the wire, e.g., the strands of the stranded wire. For example, the wire manager 900 may be positioned so that the wire manager 900 is in close proximity to the contact line "C2," shown in FIG. 9, where the distal end 146*a* of the wire pressing member 146 would contact the clamp brace 132 when the clamp brace is in the closed position and no wire is inserted into the elongated opening 144 of the wire terminal 130. In addition, a contact area 910 of the clamp brace 132 may include the textured surface 912 that is provided to grip the exposed wire strands or solid wire, e.g., the exposed strands of stranded wire, to improve the wire retention force applied to the exposed wire strands by the wire pressing member 146. The contact area 910 includes at least a portion of the clamp brace 132 where the wire pressing member 146 would contact the clamp brace 132 when the clamp brace is in the closed position and no wire is inserted into the elongated opening 144 of the wire terminal 130. In the embodiment of FIG. 17, the textured surface 912 is narrow grooves.

Figure 18:
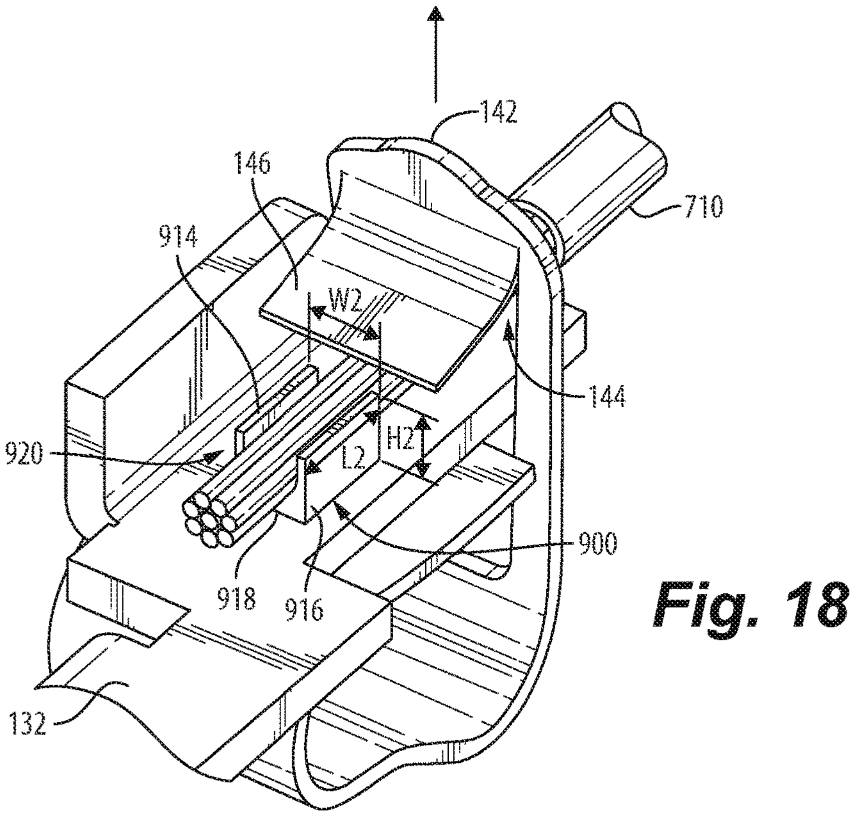
FIG. 18 is a perspective view of another exemplary embodiment of a wire manager according to the present disclosure, illustrating the wire manager associated with a clamp brace of a wire terminal.

In the exemplary embodiment shown in FIG. 18, the wire manager 900 is a U-shape like structure formed with a pair of side walls 914 and 916, and a bottom wall 918 joined to the side walls 914 and 916 and forming a wire receiving opening or channel 920. In the embodiment shown, the side walls 914 and 916 and bottom wall have a height "H2," a width "W2," and a length "L2." As a non-limiting example, the height "H2" may be in the range of, for example, about 0.05" and about 0.15", the width "W2" may be in the range of, for example, about 0.1" and about 0.2", and the length "L2" may be in the range of about 0.1" and about 0.3". The wire manager 900 is positioned on the clamp brace 132 so that the wire receiving opening 920 extends in a direction that is substantially parallel to a longitudinal axis of the clamp brace 132 as shown. The wire manager 900 is also positioned on the clamp brace 132 so that the wire manager 900 does not interfere with the wire pressing member 146 contacting the exposed conductor of the wire, e.g., the strands of the stranded wire 710. For example, the wire manager 900 may be positioned so that the wire manager 900 is in close proximity to the contact line "C2," shown in FIG. 9, where a distal end 146*a* of the wire pressing member 146 would contact the clamp brace 132 when the clamp brace 132 is in the closed position and no wire is inserted into the elongated opening 144 of the wire terminal 130. In addition, the contact area 910 of the clamp brace 132 may include the textured surface 912 that is provided to grip the exposed wire strands or solid wire, e.g., the exposed strands of stranded wire 710, to improve the wire retention force applied to the exposed wire strands by the wire pressing member 146. In this embodiment, the contact area is at least a portion of the clamp brace 132 where the exposed conductors of, for example, the stranded wire, would contact the clamp brace 132 when the clamp brace is in the closed position. As described above, the textured surface may be, for example, striations, knurling and/or small grooves on the surface of the clamp brace 132.

Figure 19:
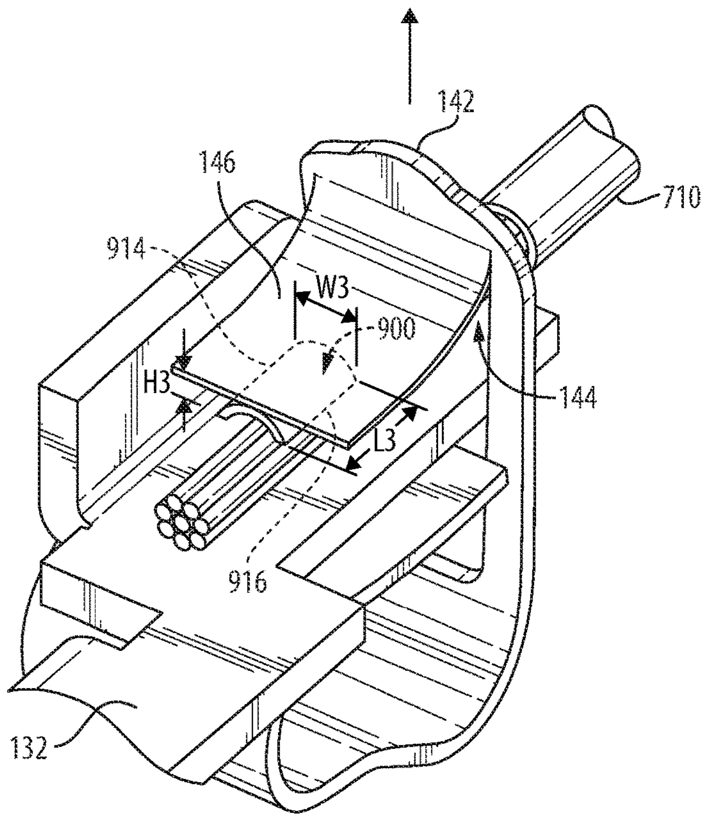
FIG. 19 is a perspective view of another exemplary embodiment of a wire manager according to the present disclosure, illustrating the wire manager associated with a wire pressing member of a force applying member of a wire terminal.

In the exemplary embodiment shown in FIG. 19, the wire manager 900 is an arcuate shape or C-shaped like structure having a wire receiving opening 920. In the embodiment shown, the sides 914 and 916 and bottom have a height "H3," a width "W3," and a length "L3." As a non-limiting example, the height "H3" may be in the range of, for example, about 0.05" and about 0.15", the width "W3" may be in the range of, for example, about 0.1" and about 0.2", and the length "L3" may be in the range of, for example about 0.1" and about 0.3". In this exemplary embodiment, the wire manager 900 is positioned on the wire pressing member 146 so that the wire receiving opening 920 extends in a direction that is substantially parallel to a longitudinal axis of the wire pressing member 146 as shown. It is noted that the wedges 902 and 904, and the U-shaped wire managers 900 described above, and any other suitable wire managers may be substituted for the arcuate shape or C-shaped like structure on the wire pressing member 146. In addition, the contact area 910 of the clamp brace 132 may include the textured surface 912 that is provided to grip the exposed wire strands or solid wire, e.g., the exposed strands of stranded wire 710, to improve the wire retention force applied to the exposed conductors of the wire, e.g., stranded wire 710 or solid wire 700, by the wire pressing member 146. In this embodiment, the contact area is at least a portion of the clamp brace 132 where the exposed conductors of, for example the stranded wire 710, would contact the clamp brace 132 when the clamp brace is in the closed position. As described above, the textured surface may be, for example, striations, knurling and/or small grooves on the surface of the clamp brace 132.

While exemplary embodiments have been chosen to illustrate the invention, it will be understood by those skilled in the art that various changes, modifications, additions, and substitutions are possible, without departing from the scope and spirit of the invention.

What is claimed is:

1. An electrical wiring device comprising:

a housing having at least one cavity within an interior of the housing, at least one wire receiving opening and at least one activating member opening, wherein the at least one activating member opening is at least partially at an angle relative to the at least one wire receiving opening; and at least one contact assembly positioned at least partially in the at least one cavity such that the at least one contact assembly is accessible from the at least one wire receiving opening and the at least one activating member opening;

wherein the at least one contact assembly includes:

a wire terminal having a clamp brace and a force applying member secured to the clamp brace, the force applying member being movable between a first position where a wire can be secured between the clamp brace and the force applying member and a second position where a wire can be inserted through the at least one wire receiving opening and between the clamp brace and the force applying member; and an activating member having a distal end positioned within the at least one activating member opening and interactive with the force applying member such that movement of the activating member in a first direction applies a force or mechanical energy to the force applying member to cause the force applying member to move from the first position to the second position, and releasing a proximal end of the activating member permits the force applying member to automatically move from the second position to the first position.

2. The electrical wiring device according to claim 1, wherein the force applying member is a clamping member.

3. The electrical wiring device according to claim 2, wherein the clamping member is a clamp spring.

4. The electrical wiring device according to claim 1, wherein when in the first position the wire is secured between the force applying member and the clamp brace by clamping the wire between the force applying member and the clamp brace.

5. The electrical wiring device according to claim 1, wherein the activating member remains in the first position or the second position until manually moved.

6. The electrical wiring device according to claim 1, wherein the movement of the activating member in the second direction is opposite the movement of the activating member in the first direction.

7. The electrical wiring device according to claim 1, wherein the movement of the activating member in the first direction and the second direction is perpendicular to the clamp brace.

8. The electrical wiring device according to claim 1, wherein the movement of the activating member in the first direction and the second direction is linear.

9. The electrical wiring device according to claim 1, wherein movement of the activating member in the first and second directions is relative to the force applying member or the clamp brace.

10. The electrical wiring device according to claim 1, wherein movement of the activating member in the first direction is outward relative to the housing and wherein movement of the activating member in the second direction is inward relative to the housing.

11. The electrical wiring device according to claim 1, wherein when in the first position the force applying member can clamp the wire with a force that is substantially perpendicular to a longitudinal axis of the wire.

12. An electrical wiring device comprising:

a housing having a plurality of cavities within an interior of the housing, a plurality of wire receiving openings and a plurality of activating member openings, wherein one of the plurality of activating member openings is at least partially at an angle relative to one of the plurality of wire receiving openings; and a plurality of contact assemblies, wherein one of the plurality of contact assemblies is positioned at least partially in one of the plurality of cavities such that the one of the plurality of contact assemblies is accessible from a respective one of the plurality of wire receiving openings, and a respective one of the plurality of activating member openings;

wherein each of the plurality of the contact assemblies includes:

a wire terminal having a clamp brace and a force applying member secured to the clamp brace, the force applying member being movable between a first position where a wire can be secured between the clamp brace and the force applying member and a second position where a wire can be inserted through the one of the plurality of wire receiving openings and between the clamp brace and the force applying member; and an activating member having a distal end positioned within the one of the plurality of activating member openings and interactive with the force applying member such that movement of the activating member in a first direction applies a force or mechanical energy to the force applying member to cause the force applying member to move from the first position to the second position, and releasing a proximal end of the activating member permits the force applying member to automatically move from the second position to the first position.

13. The electrical wiring device according to claim 12, wherein the force applying member is a clamping member.

14. The electrical wiring device according to claim 13, wherein the clamping member is a clamp spring.

15. The electrical wiring device according to claim 12, wherein when in the first position the wire is secured between the force applying member and the clamp brace by clamping the wire between the force applying member and the clamp brace.

16. The electrical wiring device according to claim 12, wherein the activating member remains in the first position or the second position until manually moved.

17. The electrical wiring device according to claim 12, wherein the movement of the activating member in the second direction is opposite the movement of the activating member in the first direction.

18. The electrical wiring device according to claim 12, wherein the movement of the activating member in the first direction and the second direction is perpendicular to the clamp brace.

19. The electrical wiring device according to claim 12, wherein the movement of the activating member in the first direction and the second direction is linear.

20. The electrical wiring device according to claim 12, wherein movement of the activating member in the first and second directions is relative to the force applying member or the clamp brace.

21. The electrical wiring device according to claim 12, wherein movement of the activating member in the first direction is outward relative to the housing and wherein movement of the activating member in the second direction is inward relative to the housing.

22. The electrical wiring device according to claim 12, wherein when in the first position the force applying member can clamp the wire with a force that is substantially perpendicular to a longitudinal axis of the wire.

23. An electrical wiring device comprising:

a housing having at least one cavity within an interior of the housing, at least one wire receiving opening and at least one activating member opening;

at least one contact assembly positioned at least partially in the at least one cavity such that the at least one contact assembly is accessible from the at least one wire receiving opening and at least one activating member opening;

wherein the contact assembly includes:

a wire terminal having a clamp brace and a force applying member secured to the clamp brace, the force applying member being movable between a first position where a wire can be secured between the clamp brace and force applying member and a second position where a wire can be inserted through the at least one wire receiving opening and between the clamp brace and the force applying member; and an activating member having a distal end positioned in the at least one activating member opening and interactive with the force applying member such that rotating the activating member in a first direction causes the distal end of the activating member to apply a force or mechanical energy to the force applying member to cause the force applying member to move from the first position to the second position, and releasing a proximal end of the activating member permits the force applying member to automatically move from the second position to the first position.

24. The electrical wiring device according to claim 23, wherein the force applying member is a clamping member.

25. The electrical wiring device according to claim 24, wherein the clamping member is a clamp spring.

26. The electrical wiring device according to claim 23, wherein when in the first position the wire is secured between the force applying member and the clamp brace by clamping the wire between the force applying member and the clamp brace.

27. The electrical wiring device according to claim 23, wherein the activating member remains in the first position or the second position until manually moved.

28. The electrical wiring device according to claim 23, wherein the movement of the activating member in the second direction is opposite the movement of the activating member in the first direction.

29. The electrical wiring device according to claim 23, wherein the movement of the activating member in the first direction and the second direction is perpendicular to the clamp brace.

30. The electrical wiring device according to claim 23, wherein movement of the activating member in the first and second directions is relative to the force applying member or the clamp brace.

31. The electrical wiring device according to claim 23, wherein movement of the proximal end of the activating member in the first direction is outward relative to a center of the housing and wherein movement of the proximal end of the activating member in the second direction is inward relative to the center of the housing.

32. The electrical wiring device according to claim 23, wherein when in the first position the force applying member can clamp the wire with a force that is substantially perpendicular to a longitudinal axis of the wire.

33. An electrical wiring device comprising:

a housing having a plurality of cavities within an interior of the housing, a plurality of wire receiving openings and a plurality of activating member openings; and a plurality of contact assemblies, wherein one of the plurality of contact assemblies is positioned at least partially in one of the plurality of cavities such that the one of the plurality of contact assemblies is accessible from a respective one of the plurality of wire receiving openings, and a respective one of the plurality of activating member openings;

wherein each of the plurality of the contact assemblies includes:

a wire terminal having a clamp brace and a force applying member secured to the clamp brace, the force applying member being movable between a first position where a wire can be secured between the clamp brace and force applying member and a second position where a wire can be inserted through the one of the plurality of wire receiving openings and between the clamp brace and the force applying member; and an activating member having a distal end positioned in the one of the plurality of activating member openings and interactive with the force applying member such that rotating the activating member in a first direction causes the distal end of the activating member to apply a force or mechanical energy to the force applying member to cause the force applying member to move from the first position to the second position, and releasing a proximal end of the activating member permits the force applying member to automatically move from the second position to the first position.

34. The electrical wiring device according to claim 33, wherein the force applying member is a clamping member.

35. The electrical wiring device according to claim 34, wherein the clamping member is a clamp spring.

36. The electrical wiring device according to claim 33, wherein when in the first position the wire is secured between the force applying member and the clamp brace by clamping the wire between the force applying member and the clamp brace.

37. The electrical wiring device according to claim 33, wherein the activating member remains in the first position or the second position until manually moved.

38. The electrical wiring device according to claim 33, wherein the movement of the activating member in the second direction is opposite the movement of the activating member in the first direction.

39. The electrical wiring device according to claim 33, wherein the movement of the activating member in the first direction and the second direction is perpendicular to the clamp brace.

40. The electrical wiring device according to claim 33, wherein movement of the activating member in the first and second directions is relative to the force applying member or the clamp brace.

41. The electrical wiring device according to claim 33, wherein movement of the proximal end of the activating member in the first direction is outward relative to a center of the housing and wherein movement of the proximal end of the activating member in the second direction is inward relative to the center of the housing.

42. The electrical wiring device according to claim 33, wherein when in the first position the force applying member can clamp the wire with a force that is substantially perpendicular to a longitudinal axis of the wire.

* * * * *